United States Patent
Ho

(10) Patent No.: US 9,800,435 B1
(45) Date of Patent: Oct. 24, 2017

(54) MULTIPLEXER LOOP ARCHITECTURE FOR DECISION FEEDBACK EQUALIZER CIRCUITS

(71) Applicant: Huong Ho, Woodlawn (CA)

(72) Inventor: Huong Ho, Woodlawn (CA)

(73) Assignee: HUAWEI TECHNOLOGIES CO., LTD., Shenzen, Guangdong (CN)

( * ) Notice: Subject to any disclaimer, the term of this patent is extended or adjusted under 35 U.S.C. 154(b) by 0 days.

(21) Appl. No.: 15/270,421

(22) Filed: Sep. 20, 2016

Related U.S. Application Data

(60) Provisional application No. 62/353,757, filed on Jun. 23, 2016.

(51) Int. Cl.
| | | |
|---|---|---|
| *H03H 7/30* | (2006.01) | |
| *H04L 25/03* | (2006.01) | |
| *H04L 12/753* | (2013.01) | |
| *H04L 5/02* | (2006.01) | |

(52) U.S. Cl.
CPC ........ *H04L 25/03057* (2013.01); *H04L 5/023* (2013.01); *H04L 45/48* (2013.01)

(58) Field of Classification Search
CPC .... H04L 25/03057; H04L 5/023; H04L 45/48
USPC ......................................................... 375/233
See application file for complete search history.

(56) References Cited

U.S. PATENT DOCUMENTS

| | | | | |
|---|---|---|---|---|
| 6,363,112 | B1* | 3/2002 | Azadet ............. | H04L 25/03057 375/232 |
| 8,165,247 | B1* | 4/2012 | Madden ........... | G11B 20/10268 375/317 |
| 9,130,797 | B1* | 9/2015 | Palusa ............... | H04L 25/03146 |
| 9,197,458 | B1* | 11/2015 | Malhotra ............. | H04L 7/0029 |
| 2003/0142697 | A1* | 7/2003 | Parhi ................. | H04L 25/03057 370/535 |
| 2006/0182172 | A1* | 8/2006 | Lin ................... | H04L 25/03057 375/233 |
| 2015/0256363 | A1* | 9/2015 | Shvydun ........... | H04L 25/03057 375/233 |

\* cited by examiner

*Primary Examiner* — Helene Tayong
(74) *Attorney, Agent, or Firm* — Norton Rose Fulbright Canada LLP

(57) ABSTRACT

Circuits, devices, methods for decision feedback equalization are described. A decision feedback circuit can include L N-tap decision feedback equalizer (DFE) branch input lines and an unfolding multiplexer array network. The network is configured to generate at least one unfolded output based on inputs from a subset of the branch input lines and includes a plurality of multiplexer arrays wherein outputs from a first multiplexer array in the plurality of multiplexer arrays are connected to selection lines of a second multiplexer array in the plurality of multiplexer arrays.

21 Claims, 24 Drawing Sheets

MULTIPLEXER LOOP ARCHITECTURE FOR DECISION FEEDBACK EQUALIZER CIRCUITS

CROSS-REFERENCE TO RELATED APPLICATIONS

This application claims all benefit, including priority, of U.S. provisional patent application No. 62/353,757, filed Jun. 23, 2016, and entitled "MULTIPLEXER LOOP ARCHITECTURE FOR DECISION FEEDBACK EQUALIZER CIRCUITS", the entirety of which is hereby incorporated by reference.

FIELD

This disclosure relates generally to the field of electronic signal processing circuits, and more particularly to decision feedback circuits.

INTRODUCTION

Equalization techniques can be used to improve signal quality or correct digital signals. In digital feedback loops, loop unrolling is a technique that pre-calculates all possible combinations of filter multiplications and additions in advance of selecting an output based on previous outputs. For a parallel circuit, the output of each branch must be valid within a single clock period, so as the number of parallel branches increases, the speed of the unrolled loops may be limited.

In loop unfolding, L levels of look-ahead expansion are performed on the unrolled architecture to create a parallel architecture. As the number of levels L increases, the resulting size of the parallel architecture and associated delays can be large and may also limit speed.

Smaller and faster decision feedback circuits would be beneficial.

SUMMARY

In some embodiments, a multiplexer loop architecture can be used in the implementation of an N-tap, L-line decision feedback equalizer (DFE) system, where N is equal or greater than 1 and L is the number of parallel DFE filters in the system. In some embodiments of the architecture, the slicer output signals propagate to the output of the N-tap DFE circuit through a shorter delay path compared to existing unfolded architectures. This architecture can, in some embodiments, require less logic resources for circuit implementations compared to the existing unfolded/unrolled architectures.

In accordance with one aspect, there is provided a decision feedback circuit including L N-tap decision feedback equalizer (DFE) branch input lines; and an unfolding multiplexer array network. The unfolding multiplexer array network includes a plurality of multiplexer arrays wherein outputs from a first multiplexer array in the plurality of multiplexer arrays are connected to selection lines of a second multiplexer array in the plurality of multiplexer arrays.

In accordance with another aspect, there is provided a method for decision feedback equalization. The method includes: for at least a first decision feedback equalizer (DFE) branch of a plurality of DFE branches in a decision feedback circuit: generating at least one unfolded output, with an unfolding multiplexer array network, based on inputs from a subset of the plurality of DFE branches, the unfolding multiplexer array network including a plurality of multiplexer arrays wherein outputs from a first multiplexer array in the plurality of multiplexer arrays are connected to selection lines of a second multiplexer array in the plurality of multiplexer arrays; and outputting the at least one unfolded output to an output block for use in the generation of an equalized signal for at least the first decision feedback equalizer branch.

In accordance with another aspect, there is provided an electronic device including L N-tap decision feedback equalizer (DFE) branch input lines; and an unfolding multiplexer array network. The unfolding multiplexer array network includes a plurality of multiplexer arrays wherein outputs from a first multiplexer array in the plurality of multiplexer arrays are connected to selection lines of a second multiplexer array in the plurality of multiplexer arrays.

DESCRIPTION OF THE FIGURES

Embodiments will now be described, by way of example only, with reference to the attached figures, wherein.

These drawings depict aspects of example embodiments for illustrative purposes, and variations, alternative configurations, alternative components and/or modifications may be made to these example embodiments.

DETAILED DESCRIPTION

The present disclosure relates generally to circuits, methods and devices for decision feedback equalization. Embodiments of the present disclosure may, in some examples, result in a potentially smaller, faster and/or lower power multiplexer loop architecture. In some examples, the application of multiplexer loop architectures described herein may allow for greater parallelization, higher clock speeds, and/or higher throughputs in parallel processing decision feedback circuits.

Figure 1:
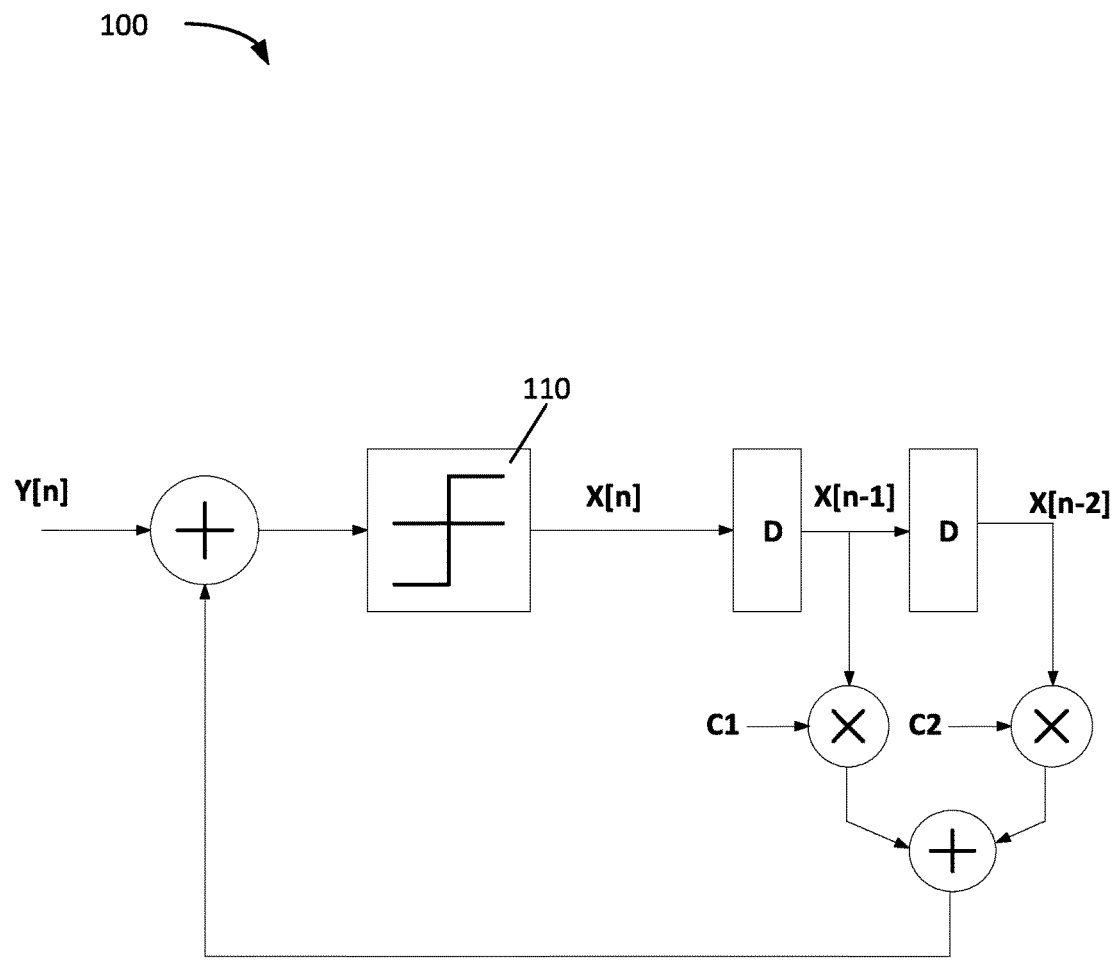
FIG. 1 is a schematic diagram showing aspects of an example 2-Tap DFE circuit with feedback.

FIG. 1 shows an example circuit 100 illustrating a serial 2-Tap decision feedback equalizer (DFE) filter with a feedback loop where the output X[n] is based on the quantized value of the input Y[n] as adjusted by the previous two output values X[n−1], X[n−2] multiplied by tap coefficients C1 and C2 respectively. In this example, the quantizer 110 (sometimes referred to as a slicer) is a two-level quantizer (e.g. with possible outputs of −1 and 1). For example, in some embodiments, Y[n] may be an input signal to be equalized such as an electronic signal which has been communicated over a communication channel and X[n] may be the equalized signal generated from the input signal.

Figure 2A:
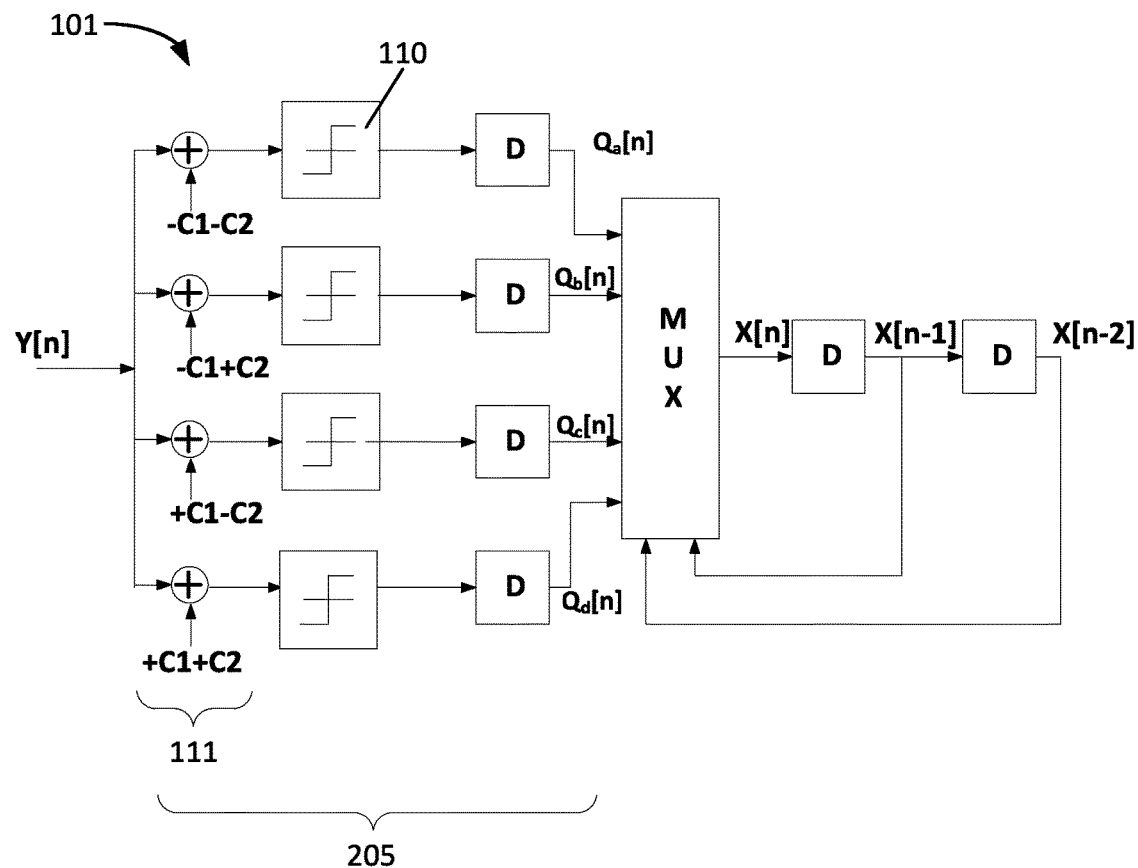
FIG. 2A is a schematic diagram showing aspects of an example unrolled circuit.

FIG. 2A, shows an example circuit 101 where the circuit 100 of FIG. 1 has been unrolled by precalculating adjusted input values for each possible combination of previous output values X[n−1] and X[n−2] as modified by corresponding coefficient values C1, C2, and selecting the appropriate pre-computed entry based on the actual previous output values X[n−1], X[n−2].

Loop unfolding is an alternative architecture where L levels of look-ahead expansion can be performed on the unrolled architecture to create a parallel architecture. In some examples, this architecture may be suitable for high throughput performance applications.

Figure 2B:
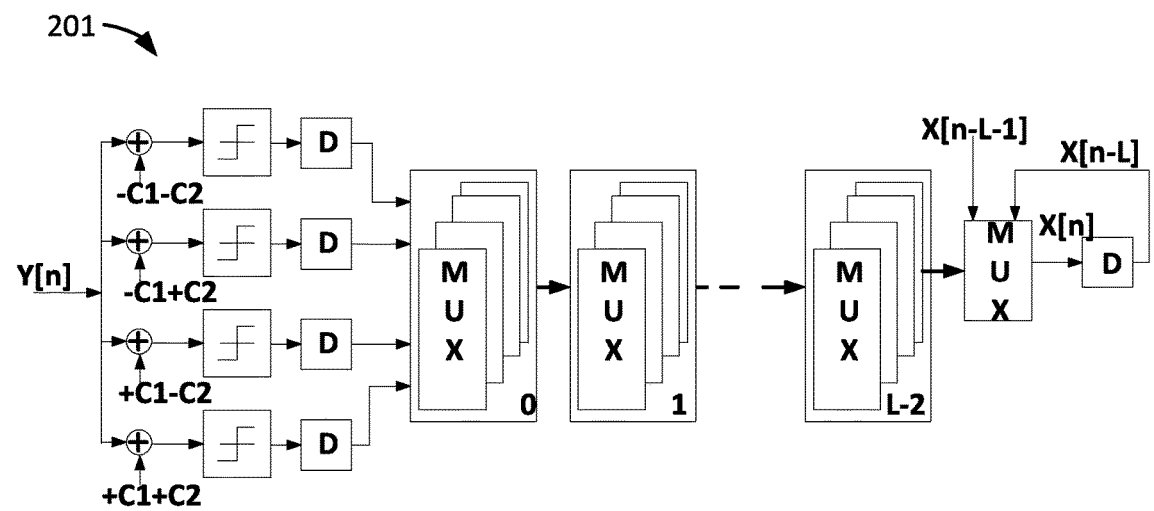
FIG. 2B is a schematic diagram showing aspects of an example unfolded circuit.

FIG. 2B shows an example of a corresponding L-level unfolded architecture 201 of the DFE system depicted in FIGS. 1 and 2A.

Figure 3:
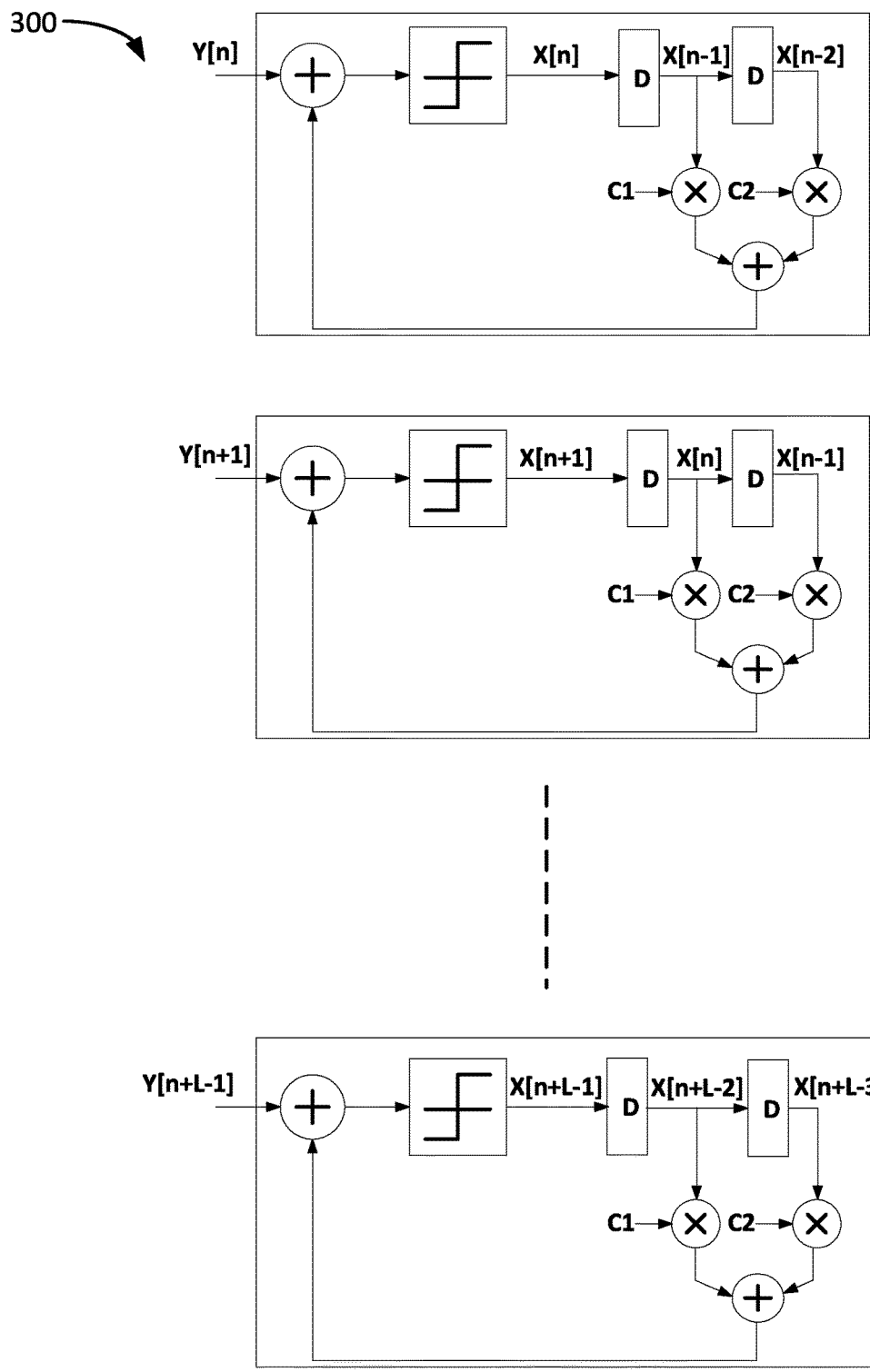
FIG. 3 is a schematic diagram showing aspects of an example 2-Tap DFE circuit having L branches operating in parallel.
Figure 4:
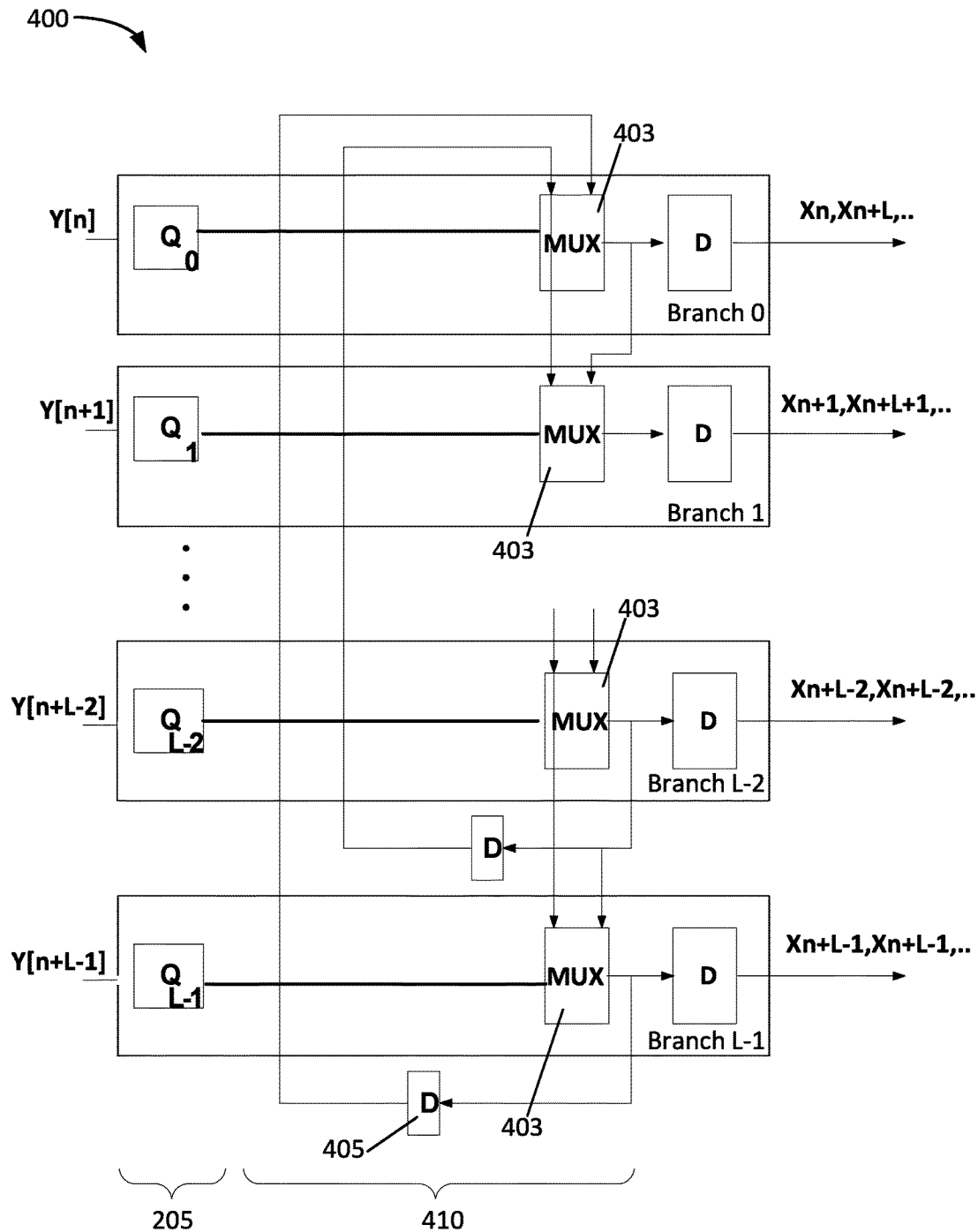
FIG. 4 is a schematic diagram showing aspects of an example unrolled architecture for the circuit in FIG. 3.

FIG. 3 shows an example circuit 300 for a system having L 2-tap DFE branches operating in parallel. As illustrated in FIG. 4, applying an unrolling technique to the circuit in FIG. 3, each branch in circuit 400 has a multiplexer circuit 410 which, in the example shown in FIG. 4, includes a multiplexer 403. For a single-bit architecture (e.g. non-return to zero or NRZ), the multiplexers 403 may be 4-to-1 MUXs. In a two-bit architecture (e.g. pulse amplitude modulation or PAM-4), the multiplexers 403 may be 16-to-1 MUXs. In contrast to the unfolded circuit (e.g. see FIG. 2B), the unrolled branches do not have a large series of multiplexers. As illustrated in FIG. 4, the output of the multiplexer circuit of an unrolled branch is dependent on the signals at output T=K−1 and T=K−2. For example, the output of Branch 0 is dependent on the outputs of Branch L−1 and Branch L−2. Similarly, the output of Branch 1 is dependent on the outputs of Branch 0 and Branch L−1. Because the output signals of the multiplexer circuits 410 of every branch have to be valid within a single clock period, in some examples, a large parallel circuit 400 may have a long critical path.

For example, in a single clock period, the output of register 405 is a selection input to the MUX of Branch 0. The output of the Branch 0 MUX is a selection input to the Branch 1 MUX whose output is a selection input of the Branch 2 MUX (not shown), etc. This cascading continues until the output of the Branch L−2 MUX is used as a selection input of Branch L−1. In other words, the critical path originating from register 405 goes through every branch's multiplexer circuit (L MUXs in the example in FIG. 4) before the output of Branch L−1 is resolved. In some examples, this timing constraint may limit the operating speed of the circuit as a whole. In some instances, this may be an increasingly important factor when L is large. In some examples, these unrolled branches cannot be easily pipelined.

Each branch represents an input line Y[i] and a corresponding output line X[i] which can provide an equalized output signal from the inputted signal Y[i]. In the example circuit 300 shown in FIG. 3, the circuit/logic for each branch is distinct or otherwise has limited or no interaction with the circuit/logic for another branch. In some embodiments described herein, inter-branch connections may be used to reduce the size and/or reduce the length of the critical path for the decision feedback circuit.

The lines in FIG. 4 and any other figure should be understood to represent multiple lines or values where applicable.

Figure 5A:
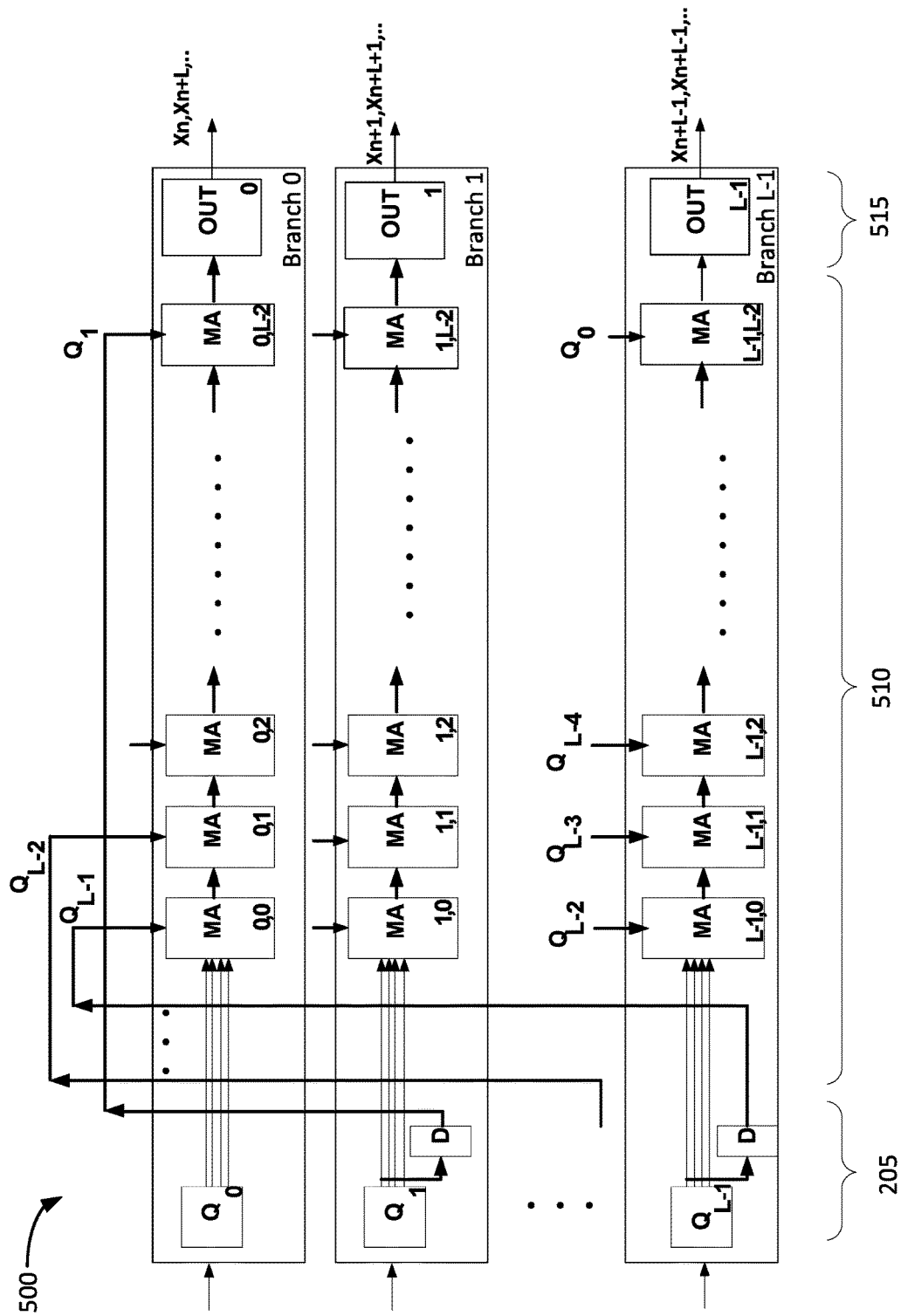
FIG. 5A is a schematic diagram showing aspects of an example unfolded architecture for the circuit in FIG. 3.

As illustrated in FIG. 5A, applying an unfolding technique to the circuit in FIG. 3, each branch in circuit 500 has a multiplexer circuit 510 including series of multiplexer blocks or arrays (MA). The outputs of the pre-computation stage 205 of each branch are used to control the outputs of the multiplexer circuits of other branches. In FIG. 5A, each unfolded branch has L−1 multiplexers, and output signals from each pre-computation stage 205 propagate through L−1 levels of multiplexer delay before reaching the output block 515. As L increases, the number of multiplexers and the multiplexer delays increase.

Figure 5B:
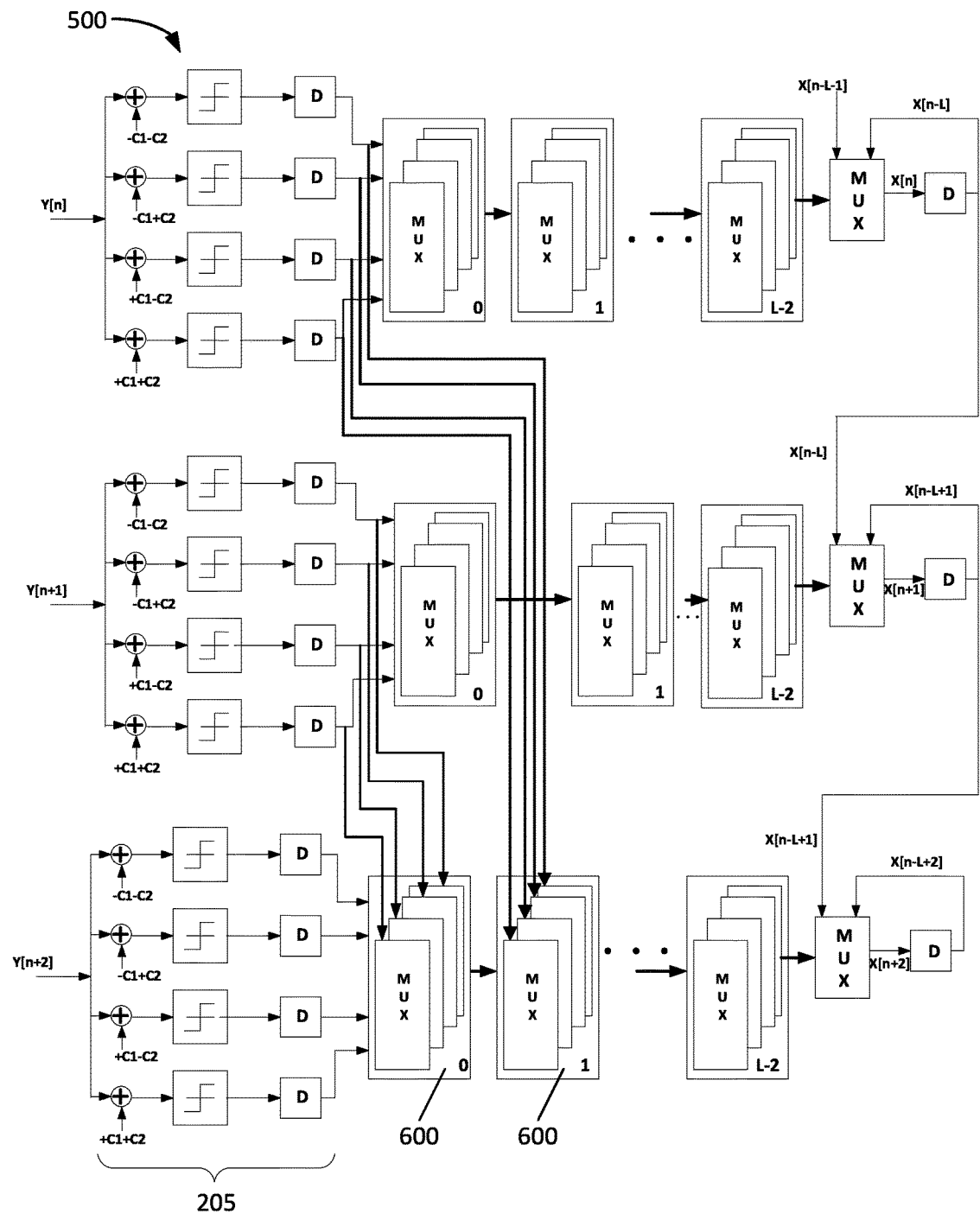
FIG. 5B is a schematic diagram showing an example unfolded architecture illustrating connections between aspects of a pre-computation stage and aspects of a multiplexer circuit.

FIG. 5B shows an example unfolded architecture illustrating connections between the quantizer outputs for the pre-computation stages 205 of branches n and n+1 and the selection inputs to the first two multiplexer blocks 600 in the n+2 branch. For clarity, the selection inputs for the other multiplexer blocks have not been shown.

Figure 6A:
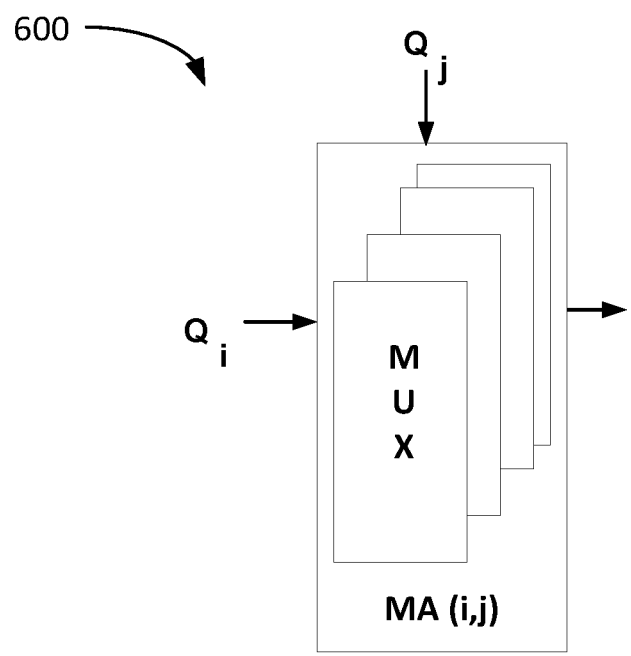
FIG. 6A is a schematic diagram showing aspects of an example multiplexer building block for a DFE branch.

FIG. 6A shows an example circuit of a multiplexer block 600 in the multiplexer circuit of an unfolded branch. The multiplexer block 600 in FIG. 6A selects from inputs based on the tap-adjusted inputs of the $i^{th}$ branch using the tap-adjusted inputs of the $j^{th}$ branch as selectors. Each multiplexer block 600 can include an array of multiplexers, one for each possible combination of tap-adjusted inputs. In some examples, the number of combinations may depend on the number of taps in the circuit architecture. Each multiplexer in a block can have the same $Q_i$ signals as inputs. Each multiplexer in the array can select from the $Q_i$ signals using a different combination of tap-adjusted inputs from $Q_j$. In some examples, the number of combinations may depend on the number of quantization levels in the circuit architecture.

For example, for a 2-tap architecture with 2 levels of quantization (e.g. −1, +1), $Q_i$ could include four signals for the $i^{th}$ branch as illustrated by the outputs of the pre-computation stage 205 illustrated in FIG. 2A. These four $Q_i$ signals would be inputs to each of four multiplexers in the multiplexer block. The 2 selection inputs for each of the four multiplexers would correspond to a possible combination of the output signals from the pre-computation stage of the $j^{th}$ branch.

Figure 6B:
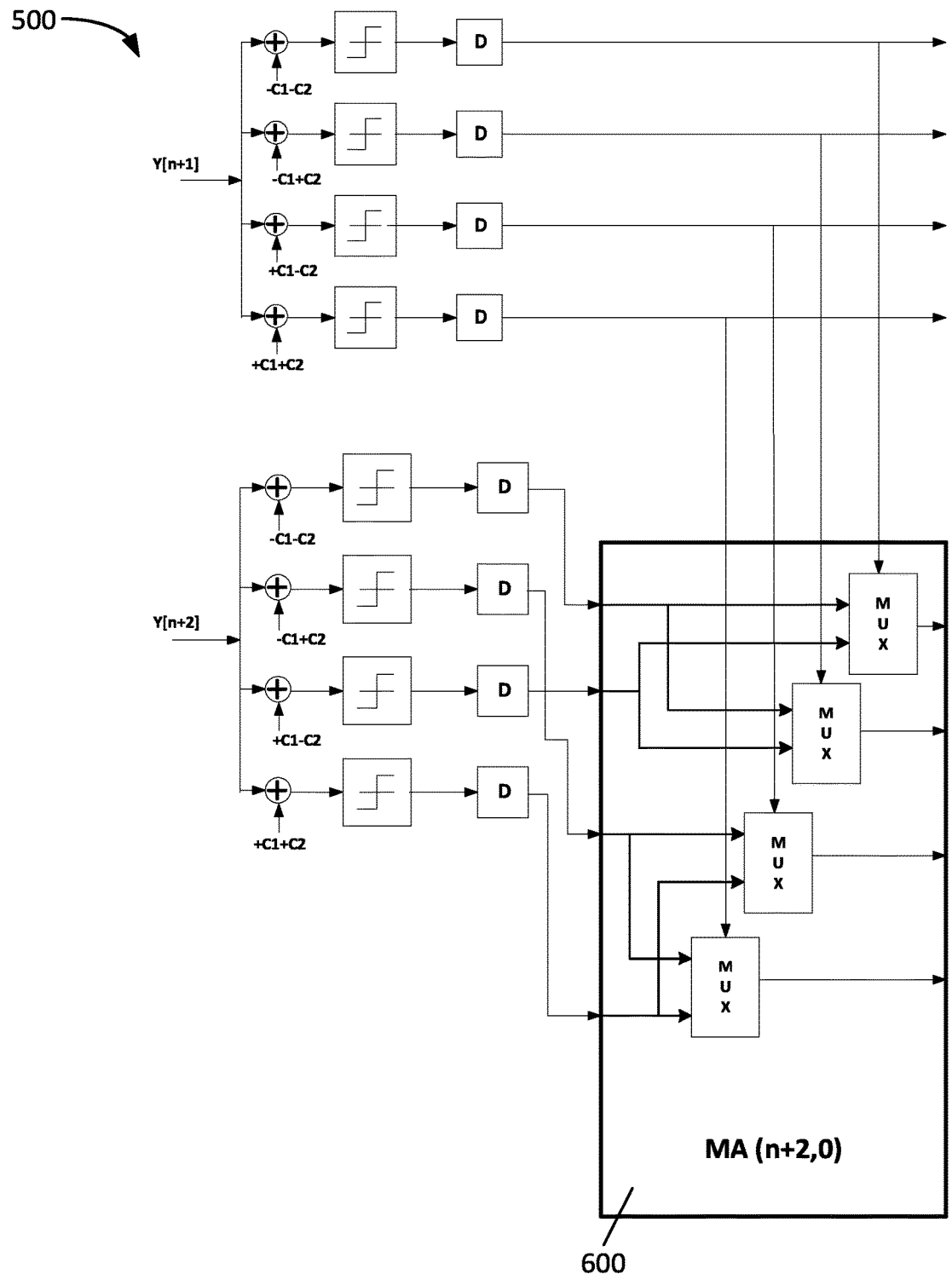
FIG. 6B is a schematic diagram showing aspects of a quantizer and an example multiplexer building block for a DFE branch.

FIG. 6B shows a portion of the example circuit of FIG. 5B including a refined view of the multiplexer array 600. In the example NRZ circuit of FIG. 6B, the MUXs are 2-to-1 multiplexers. In other embodiments, the number and arrangement of multiplexers is adjusted based on the number of taps and the number of quantization levels in the architecture. For example, larger multiplexers and/or additional multiplexers may be used in the multiplexer array 600 for architectures based on a larger number of taps and/or a larger number of quantization levels.

For example, for a PAM4 circuit, the multiplexer array can be implemented with sixteen 4-to-1 multiplexers, i.e. four 4-to-1 MUXs for each 2-bit tap-adjusted input (two MUXs for each bit).

Figure 7:
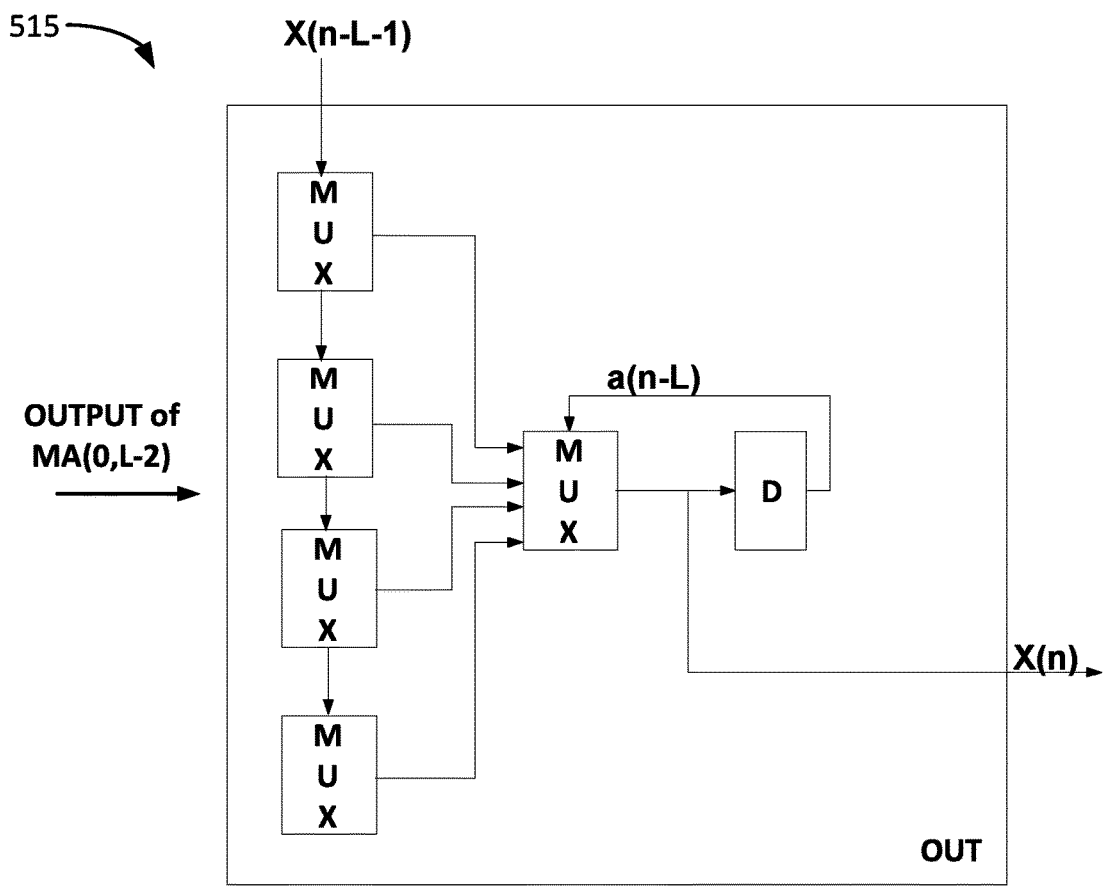
FIG. 7 is a schematic diagram showing aspects of an example output block for a DFE branch.

FIG. 7 shows an example circuit of an output block 515. The output block 515 for each branch can, in some embodiments, be configured to select one of the outputs of the multiplexer circuit 510 based on at least one previous output value. For example, in some embodiments, the DFE branch may be configured to select one of the outputs of the multiplexer circuit 510 based on a previous output of the same branch, such as a(n-L) in FIG. 7. In some embodiments, the DFE branch may be configured to select one of the outputs of the multiplexer circuit 510 based on a previous output as determined from another branch such as X(n–L-1) in FIG. 7. In some embodiments, the DFE branch may be configured to select one of the outputs of the multiplexer circuit 510 based on a combination of previous outputs from the same branch, and previous outputs determined from other branches.

Figure 8:
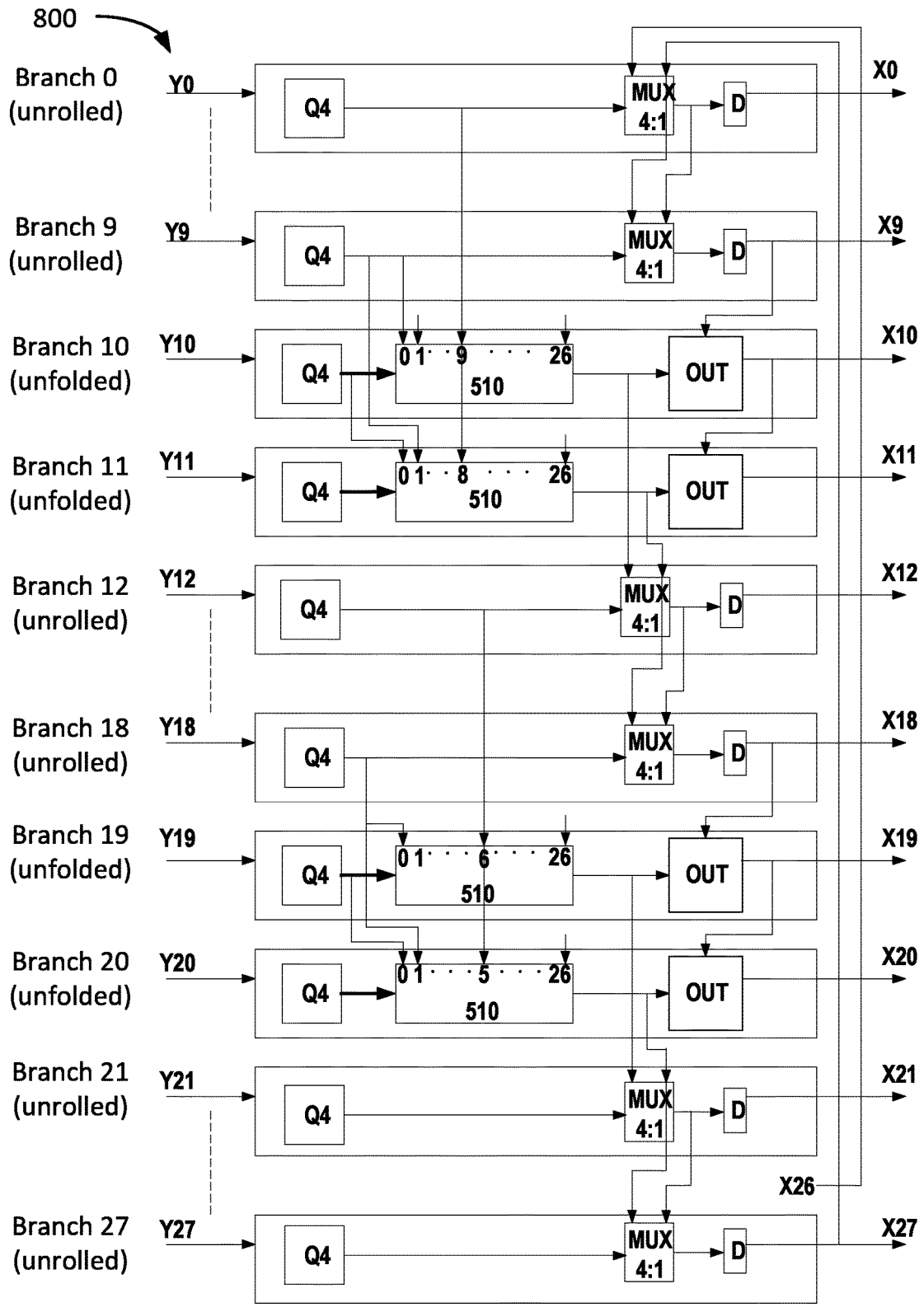
FIG. 8 is a schematic diagram showing aspects of an example architecture having unrolled and unfolded branches.

FIG. 8 shows aspects of an example 2-tap circuit 800 having L=28 N-tap digital feedback equalizer (DFE) branches. In the example circuit 800, the branches alternate between sets of unrolled branches and sets of unfolded branches. In this example circuit, there are three sets of unrolled branches (Branches 0-9, 12-18, 21-27), and two sets of unfolded branches (Branches 10-11, 19-20). The insertion of the sets of unfolded branches may split the critical path through the 4-to-1 MUXs in the unrolled branches into shorter paths.

In the example unrolled architecture in FIG. 4, for a circuit 400 with 28 branches, the delay path starts at the register 405 and traverses through 28 levels of MUXs. In contrast, the example hybrid unrolled-unfolded architecture in FIG. 8 splits or otherwise has shorter delay paths. The delay path starting from input Y10 traverses through 26 multiplexer arrays in the multiplexer circuit 510 of branch 10 and then through seven 4:1 multiplexers (in Branches 12 through 18). In some instances, this particular delay path may be a critical path which limits the speed of the circuit 800 and potentially any subsequent circuits or devices relying on the outputs of the circuit 800.

By way of comparison, FIGS. 9A, 9B, 9C, and 10 show different example architectures for N=2 taps, L=32 lines, PAM4 (S=2-bit) DFE circuits.

Figure 9A:
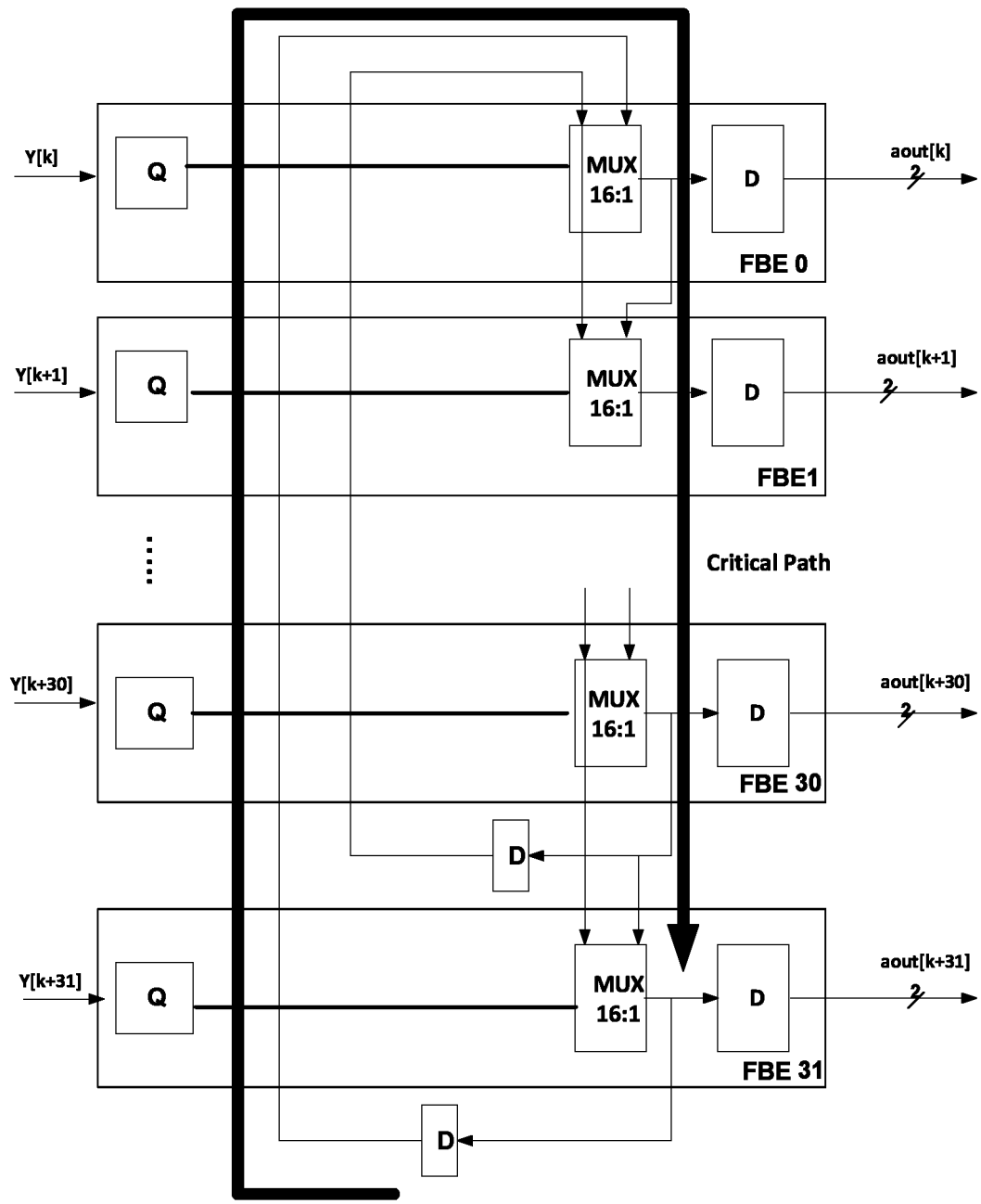
FIG. 9A is a schematic diagram showing aspects of an example unrolled architecture.

FIG. 9A shows an unrolled circuit architecture 900. Since no pipeline registers can be inserted to break up the delay path from input to output of the circuit, the critical path which runs from slice 0 to slice L-1 (line 31) could become a timing bottle neck.

Figure 9B:
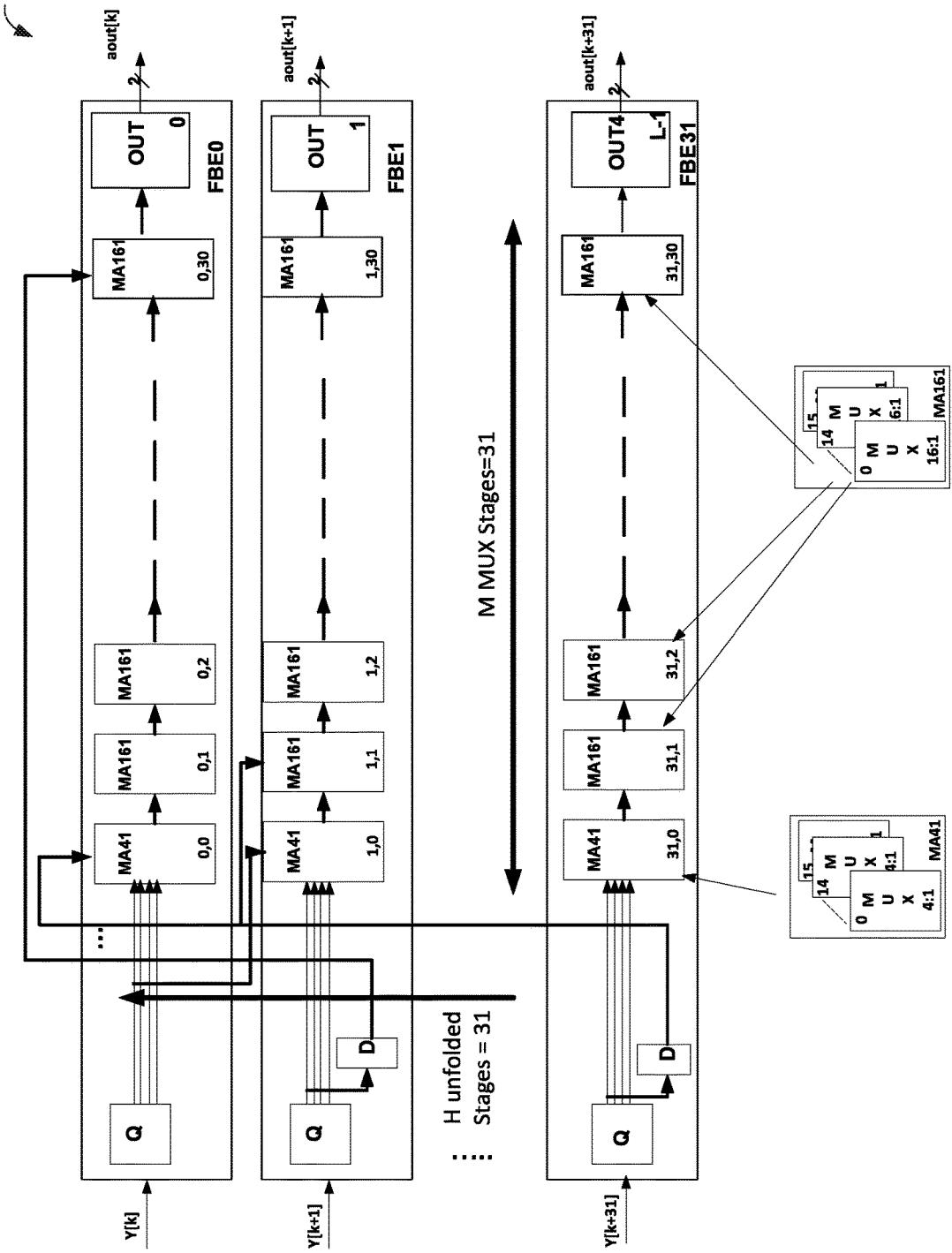
FIG. 9B is a schematic diagram showing aspects of an example unfolded architecture.

FIG. 9B shows an unfolded circuit architecture 901 which enables the use of pipelining registers to break up long delay into shorter data paths but the trade-off is a lot of multiplexers are required to build the Multiplexer Array (MA) circuits.

Figure 9C:
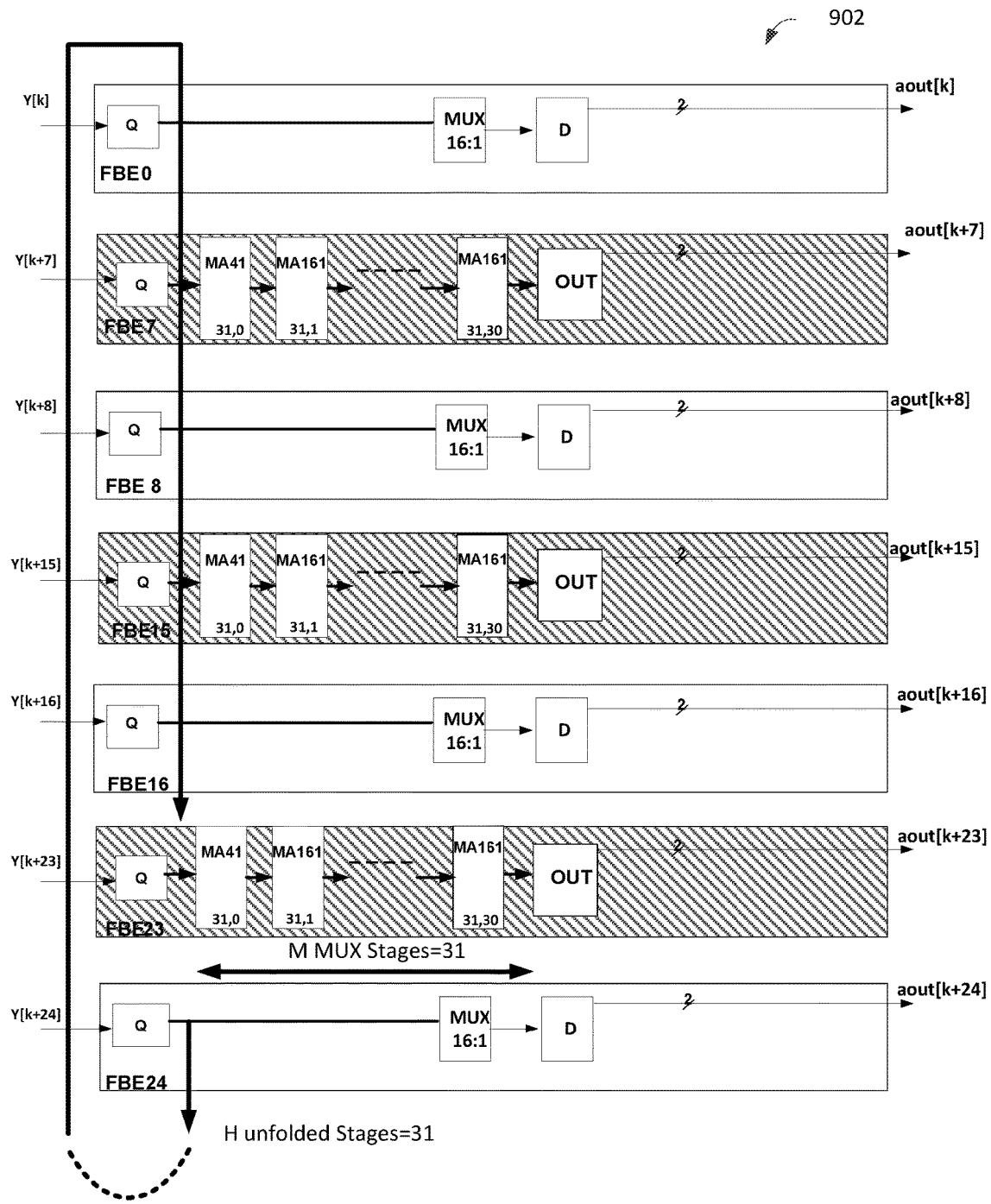
FIG. 9C is a schematic diagram showing aspects of an example hybrid architecture.

FIG. 9C shows a hybrid circuit architecture 902 having both unrolled (illustrated as unshaded branches) and unfolded (illustrated with diagonal striped shading) branches. In this example architecture, three unfolded outputs are generated on slices 7, 15 and 23. Based on this architecture, each output of an unfolded slice requires one MA which is designed based on H=L-1 unfolded stages and M=L-1 MUX stages. The architecture 902 illustrated in FIG. 9C can be pipelined, and the number of unfolded outputs is much smaller than L. In the architecture in FIG. 9C, each unfolded branch has 31 MUX stages.

As illustrated for example in FIGS. 5A, 5B, 8, 9B, and 9C, different DFE architectures can include one or more unfolded branches (sometimes referred to as slices). In some instances, unfolded branches may be pipelined and/or may be suitable for high throughput applications.

In some embodiments, all branches may be unfolded (for example, see FIG. 5A, 9B). In other embodiments, a subset of branches in an architecture may be unfolded and others may be unrolled as illustrated, for example, in FIGS. 5B, 8, and 9C.

In the architectures illustrated, for example, in FIG. 9B, an unfolded branch includes a multiplexer array corresponding to every other branch in the design. In other words, each unfolded branch has L-1 multiplexer arrays. For architectures with a large number of parallel branches (i.e. L is large), the area requirements for and the critical path through an unfolded branch can be large.

The following figures and the description herein provide examples illustrating an unfolded branch architecture which may, in some instances, have smaller area requirements and/or have shorter critical paths.

In some embodiments, the unfolded branch architectures described herein can be applied to architectures which generate at least one unfolded branch output. These unfolded branch architectures can, in some instances, be applied to DFE architectures where any number of branch outputs are unfolded in different arrangements and/or combinations. In some instances, the unfolded branch architectures can be applied to DFE architectures where all the branches are unfolded.

Figure 10:
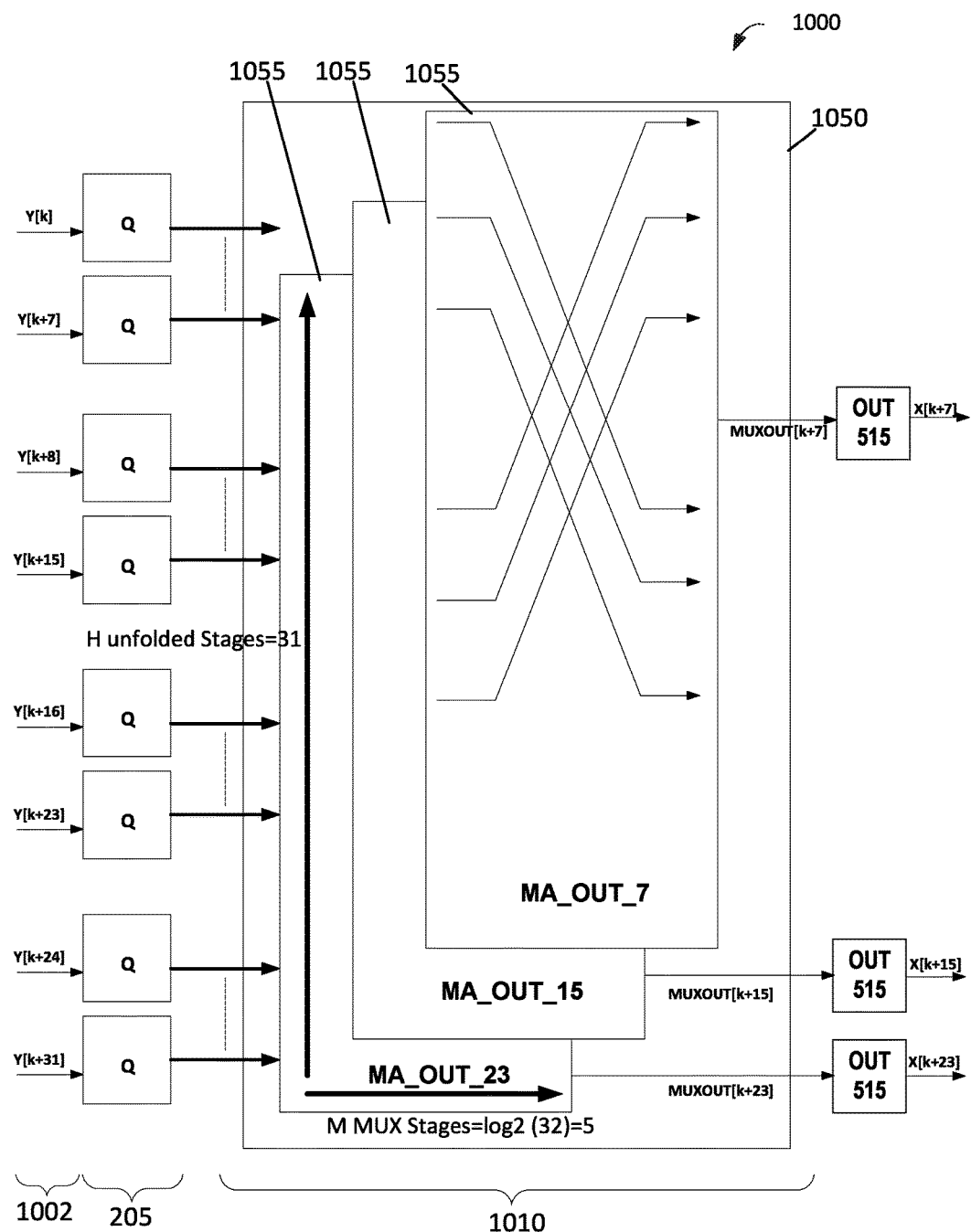
FIG. 10 is a schematic diagram showing aspects of an example architecture for generating unfolded outputs.

FIG. 10 shows a high-level view of aspects of an example decision feedback circuit DFE circuit 1000 including L N-tap digital feedback equalizer (DFE) branch input lines. The circuit 1000 in FIG. 10 has L=32 lines, N=2 taps, and PAM4 signals (S=2-bit). The circuit 1000 generates three unfolded outputs on branches 7, 15, and 23. Compared to M=L-1 stages of MUXs used for each unfolded branch (i.e. 31 stages for an L=32 circuit) in the architecture 902 of FIG. 9C, in some embodiments, each MA block in this circuit 1000 can have M=$\log_2$ L levels of MUX stages which results in a much smaller delay path and potentially a much smaller circuit.

In this example architecture, L=32 and the circuit 1000 has 32 branch input lines with which it receives parallel input signals Y[k] . . . Y[k+31] for processing. Each branch is configured to generate an output signal X[i] for each input signal Y[i]. Although only eight branches inputs are explicitly illustrated in the example in FIG. 10, any suitable number of branches may be included in the circuit 1000 architecture. In other examples, the number of branch inputs lines may vary depending, for example, on the parallel processing requirements for the circuit 1000. In some embodiments, the branch input lines may be any interconnects, wires, busses or any other individual or grouped connections for providing input signals to the circuit 1000.

In some embodiments, a decision feedback branch can include a pre-computation stage 205 configured to generate a set of tap-adjusted inputs Q[n]. Each tap-adjusted input Q corresponds to a possible value or set of values for previous outputs of the same DFE branch (e.g. X[n−1], X[n−2]). In some examples, the number of tap-adjusted inputs may depend on the number of taps in the circuit architecture.

In some embodiments, for each output value in the set of possible output values, the pre-computation stage 205 may include a pre-computation circuit 111 configured to add or otherwise adjust an input to the DFE branch Y[n] by one or more pre-computed tap values (e.g. C1, −C1, C2, −C2) associated with the circuit's corresponding previous one or more output values (e.g. +1, −1). The pre-computation stage can also include quantizers 110 configured to quantize outputs from the pre-computation circuits into one of a set of possible output values (e.g. +1, −1). In some embodiments, the set of tap-adjusted inputs corresponds to the set of outputs of the branch's quantizers 110.

These quantizer outputs can, in some examples, represent the quantized value of the current input Y[n] as adjusted by the feedback filter values as determined by the pre-computation circuits 111.

In some embodiments, the tap coefficients (C1, −C1, C2, −C2, etc.) may be based on measured, calculated or otherwise obtained correction factors. In some embodiments, no correction factor may be applied. For example, one or more coefficient values may have a value of one.

For example, in some 2-tap, two-quantization level embodiments, the pre-computation circuits 205 in FIG. 10 may have the structure illustrated in FIG. 2A. Each tap-adjusted input ($Q_a[n]$, $Q_b[n]$, $Q_c[n]$, $Q_d[n]$) corresponds to a set of one or more possible values for previous outputs of the DFE branch ({X[n−1], X[n−2]}={−1, −1}, {−1, +1}, {+1, −1}, {+1, +1}). In other examples, different numbers of tap and/or different numbers of quantization levels may be used.

In some embodiments, the circuit can include a multiplexer circuit 1010 configured to select from each branch's set of tap-adjusted inputs to generate a corresponding multiplexer circuit output for each branch. The multiplexer circuit 1010 includes one or more unfolding multiplexer array networks 1050 configured to generate one or more unfolded outputs based on the tap-adjusted inputs from a subset of the branch input lines. In some embodiments one or more of the unfolded output(s) are generated based on a proper subset of the branch input lines. In other embodiments, one or more of the unfolded output(s) are generated from all of the branch input lines.

The one or more unfolding multiplexer array networks 1050 include multiple multiplexer arrays. In some embodiments, the multiplexer arrays in an unfolding multiplexer array network 1050 can be physically or logically arranged to include one or more smaller or inner unfolding multiplexer array networks 1055. In some embodiments, the multiplexer arrays in the multiplexer circuit 1010 can be physically or logically arranged to include multiple levels/hierarchies of smaller unfolding multiplexer array networks.

In some embodiments, the unfolding multiplexer array network 1050 can be physically or logically arranged as a single network that does not include any smaller or inner unfolding multiplexer array networks. For example, while the examples described in the following few figures show logical blocks which may be viewed as smaller unfolding multiplexer array networks, in some instances, the hierarchy of logical blocks can be flattened into a single multiplexer array network.

Figure 11A:
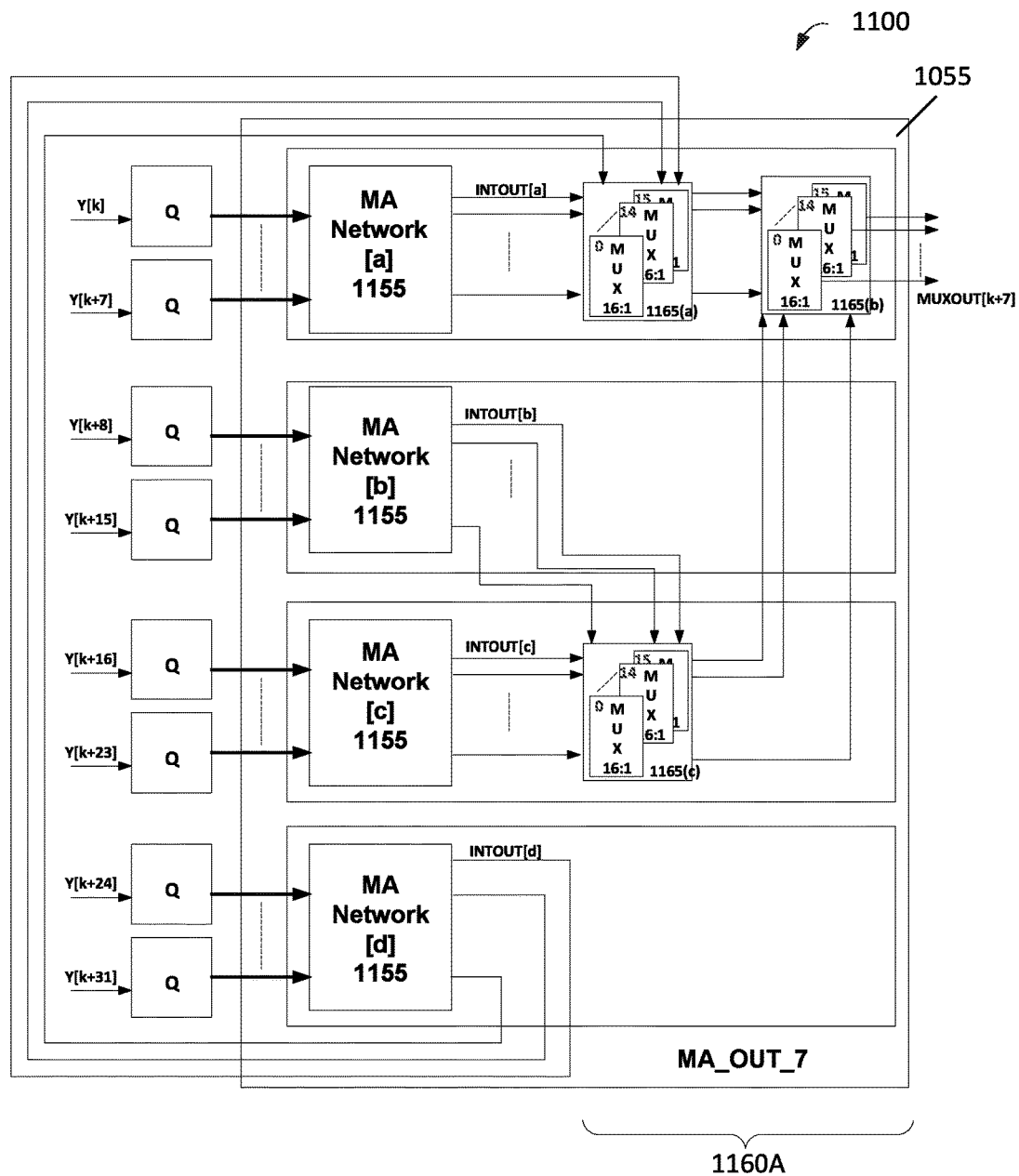
FIGS. 11A, 11B and 11O are schematic diagrams showing example architectures illustrating aspects of the unfolding multiplexer array network of FIG. 10

FIG. 11A shows a circuit 1100 including aspects of the example decision feedback circuit DFE circuit 1000 which generate the multiplexer output for branch Y[k+7]. The multiplexer array network 1055 labelled as MA_OUT_7 includes four inner multiplexer array networks 1155. Each of these inner unfolding multiplexer array networks 1155 is configured to generate at least one intermediate output from inputs from a respective subset of branch input lines. For example, the unfolding multiplexer array network labelled as MA Network [a] receives tap-adjusting inputs based on branch inputs for lines Y[k] . . . Y[k+7], and generates intermediate outputs INTOUT[a]. In some instances, these outputs can be considered intermediate as they may be used as inputs to subsequent multiplexer arrays in the multiplexer circuit, and may not be a final output of the multiplexer circuit. Similarly, MA Network [b] generates intermediate outputs INTOUT[b] based on branch inputs for lines Y[k+8] . . . Y[k+15]; MA Network [c] generates intermediate outputs INTOUT[c] based on branch inputs for lines Y[k+16] . . . Y[k+23]; and MA Network [d] generates intermediate outputs INTOUT[d] based on branch inputs for lines Y[k+24] . . . Y[k+31].

In some embodiments, the multiplexer array network 1055 includes an inter-subset multiplexer array network 1160A which includes one or more multiplexer arrays 1165 which is configured to use the intermediate outputs from the MA Networks associated with different subsets of branch input lines to generate a multiplexer array output MUXOUT [k+7].

In some embodiments, a multiplexer array 1165(*c*) in the inter-subset multiplexer array network 1160A has input line inputs based on the intermediate outputs INTOUT[c] of one unfolding multiplexer array network MA Network [c], and selection line inputs based at least in part on intermediate outputs of another unfolding multiplexer array network MA Network [b].

In some embodiments, a multiplexer array 1165(*b*) in the inter-subset multiplexer array network 1160A has input line inputs based on the outputs of another multiplexer array 1165(*a*) in the inter-subset multiplexer array network 1160. As seen in FIG. 11A, the input line inputs for multiplexer array 1165(*b*) are based at least in part on the intermediate outputs of MA Network [a]. The selection line inputs are based on the outputs of yet another multiplexer array 1165 (*c*) in the inter-subset multiplexer array network 1160A. As seen in FIG. 11A, the selection line inputs for multiplexer array 1165(*b*) are based at least in part on the intermediate outputs of MA Network [c].

In some embodiments, the multiplexer arrays in the inter-subset multiplexer array network 1160A and/or the multiplexer arrays in the multiplexer array networks 1155 are arranged in a (reduction) tree arrangement to generate the multiplexer array output(s) MUXOUT[k+7].

Figure 11B:
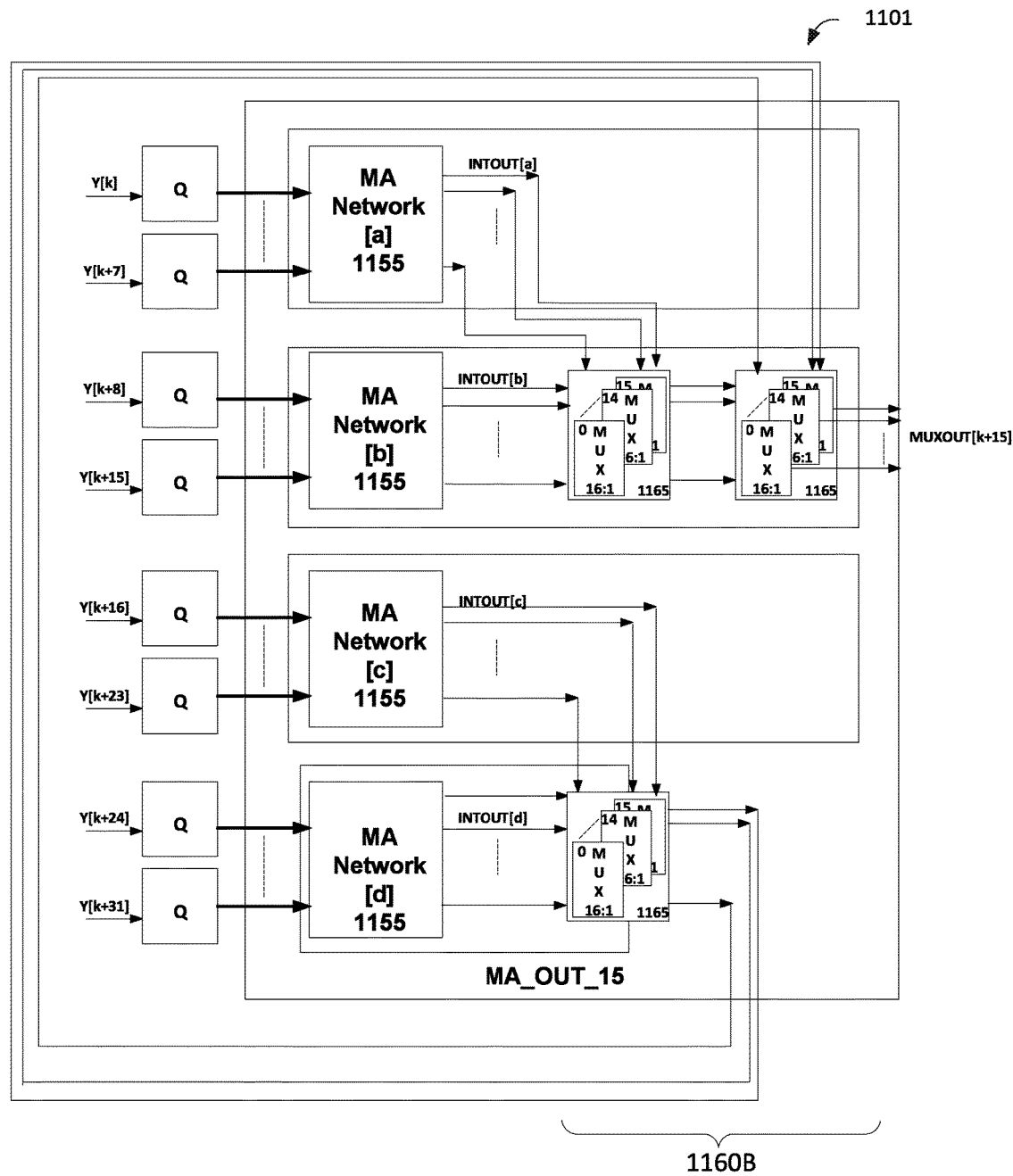
Figure 11C:
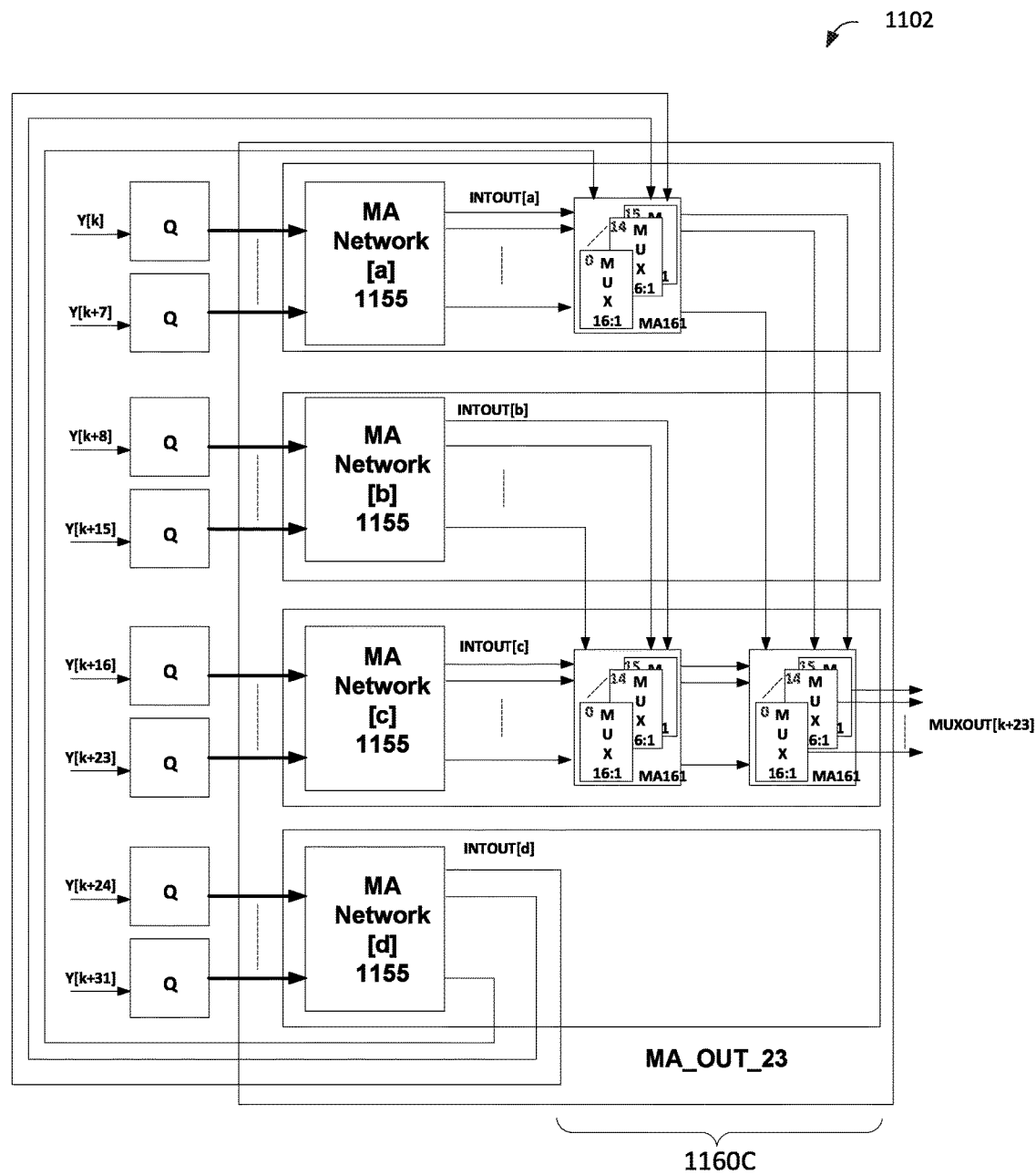

FIGS. 11B and 11O show circuits 1101, 1102 including aspects of the example decision feedback circuit DFE circuit 1000 which generate the multiplexer output for branches Y[k+15], and Y[k+23] respectively. As illustrated in FIGS. 11A, 11B and 11C, in some embodiments, the intermediate outputs INTOUT[a], [b], [c], [d] (and MA Networks [a], [b], [c], [d] 1155) are the same for each MUXOUT output. In other words, in some embodiments, the same multiplexer array networks can be used to generate the intermediate outputs used by the three different inter-subset multiplexer array networks 1160A, 1160B, 1160C. In some embodiments, this may reduce the size and/or power requirements of the circuit 1000.

In some instances, the circuit architecture (e.g. the reduction tree-like arrangement) can shorten the delay path (e.g. reduce the number of multiplexer layers an input signal must propagate through) to generate one or more outputs.

Figure 12:
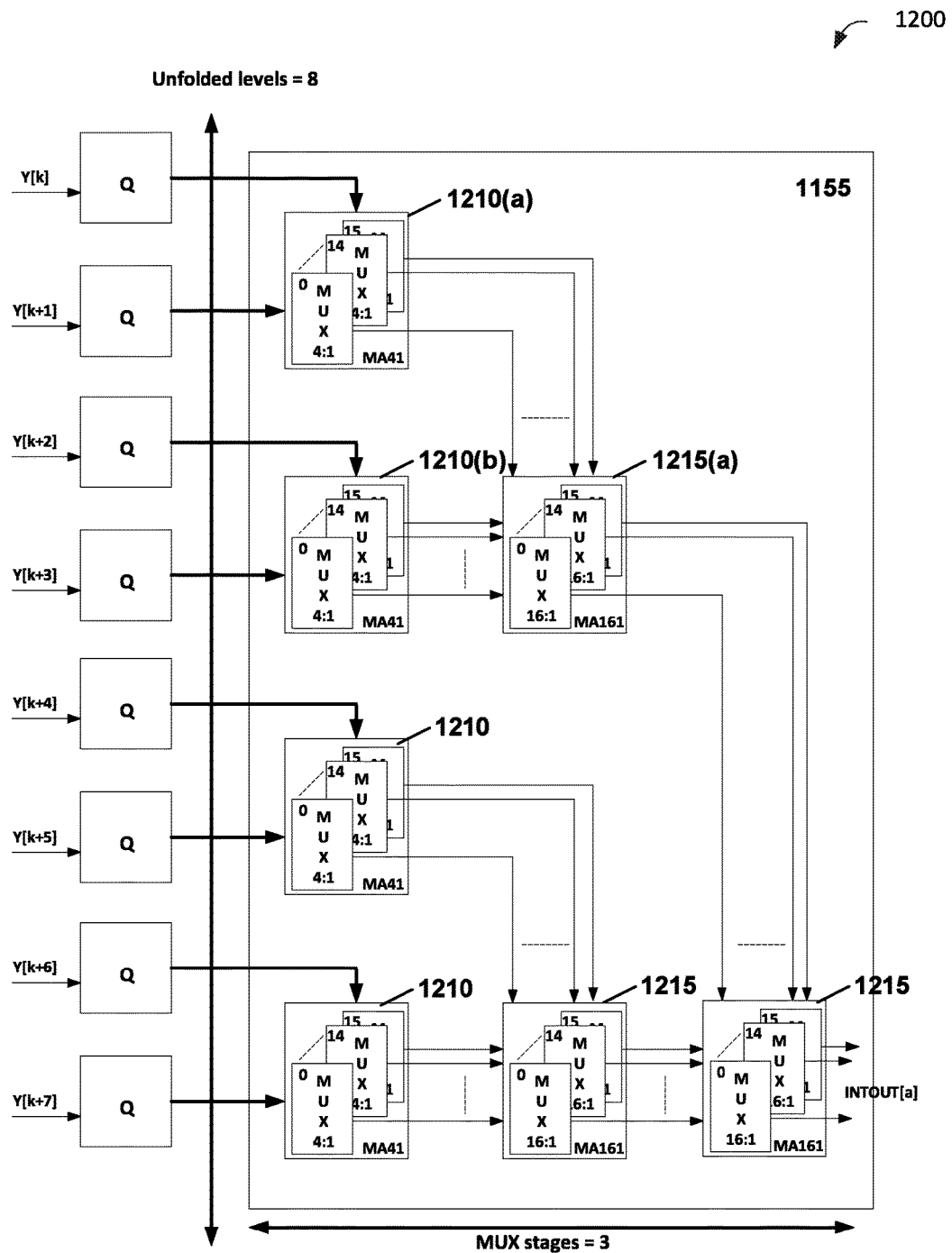
FIG. 12 is a schematic diagram showing an example architecture illustrating aspects of an unfolding multiplexer array network.

FIG. 12 shows an example schematic view of a circuit 1200 including a more detailed view of the multiplexer array network. In this example, the circuit 1200 includes MA Network [a] 1155 in FIGS. 11A-11O. The unfolding multiplexer array network 1155 is configured to generate at least one intermediate output from inputs from a respective subset of branch input lines. In the illustrated example, the unfolding multiplexer array network 1155 receives tap-adjusting inputs based on branch inputs for lines Y[k] . . . Y[k+7], and generates intermediate outputs INTOUT[a].

The unfolding multiplexer array network 1155 includes a plurality of multiplexer arrays 1210, 1215. In some embodiments, the multiplexer array network 1155 can include one or more multiplexer arrays 1210 which have input line inputs and/or selection line inputs that are the tap-adjusted inputs of one of the branches. For example, the multiplexer array labelled as 1210(a) receives tap-adjusted inputs for branch Y[k+1] at its input lines, and tap-adjusted inputs for branch Y[k] at its selection lines.

In some embodiments, the multiplexer array network 1155 includes one or more multiplexer arrays 1215 which have input line inputs and/or selection line inputs that are connected to the outputs of another multiplexer array in the network 1155. For example, the multiplexer array labelled as 1215(a) receives the outputs of multiplexer array 1210(b) at its input lines, and the outputs of multiplexer array 1210(a) at its selection lines.

In some instances, the reduction tree-like arrangement of the multiplexer arrays reduces the number of multiplexers in the critical path from the tap-adjusted inputs to the output (INTOUT) of the multiplexer array network 1155. For example, a fully unfolded output for one branch of an eight branch circuit using the architecture in FIG. 9B would have seven multiplexer stages in the critical path. In contrast, the unfolded output (INTOUT) for the multiplexer array network 1155 has three multiplexer stages in its critical path.

Referring again to FIG. 10, the critical path for this L=32 DFE from the inputs of the multiplexer array network 1050 to any of the multiplexer array network outputs MUXOUT [k+7], MUXOUT [k+15], MUXOUT [k+23] is five multiplexer stages. This is in contrast to the unfolded architecture in FIG. 9B which has 31 multiplexer stages in its critical path.

In some embodiments, the each unfolded output of the multiplexer array networks 1050 is provided to a corresponding output block 515 (illustrated for example in FIGS. 7 and 8) to generate output(s) for the unfolded branch(es).

In architectures having a combination of unfolded and unrolled branches, the unrolled branch outputs can be generated by circuits and/or devices as illustrated in FIG. 4 or otherwise.

Figure 13:
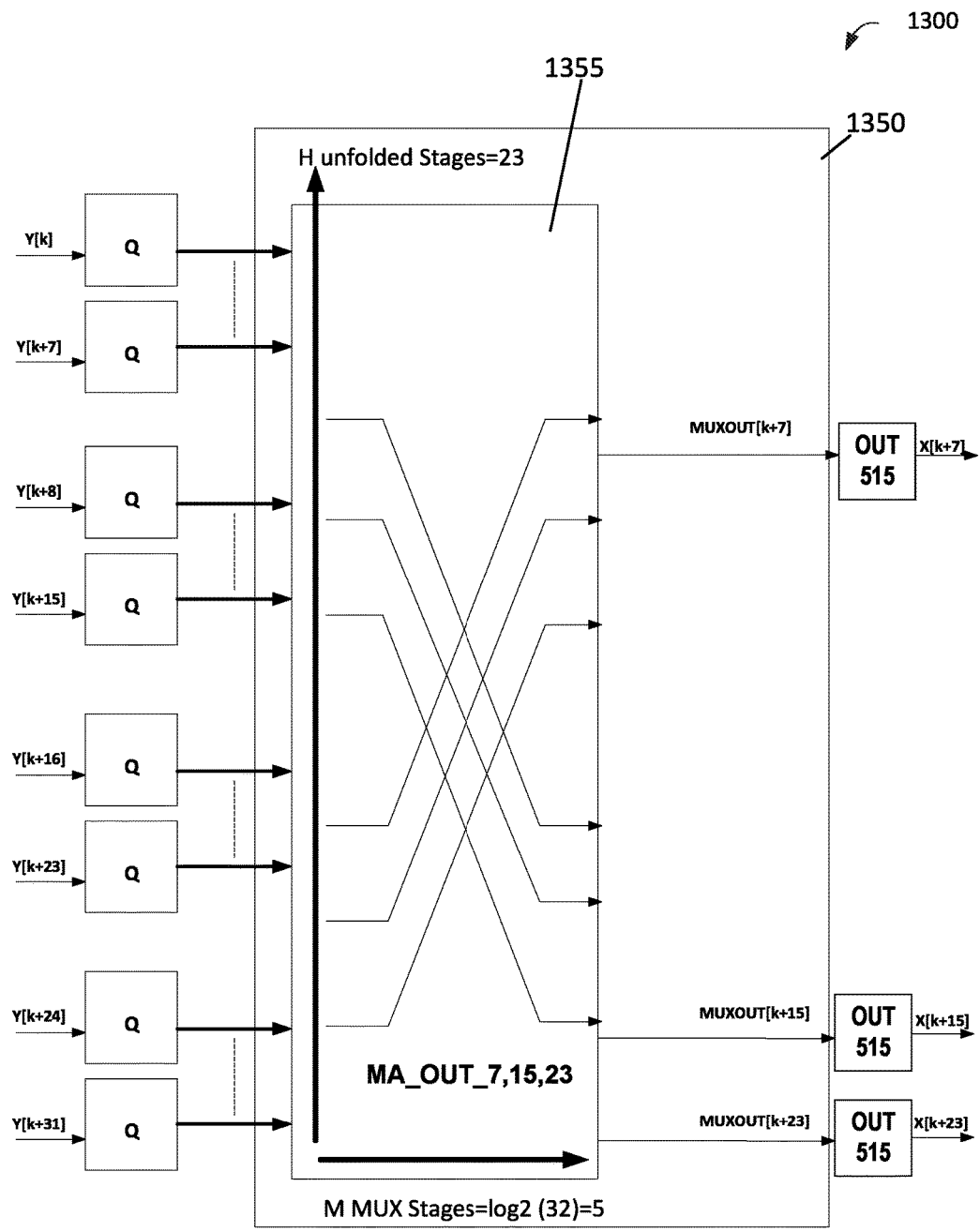
FIG. 13 is a schematic diagram showing aspects of another example architecture for generating unfolded outputs.

FIG. 13 shows a high-level view of aspects of another example decision feedback circuit 1300 including L N-tap digital feedback equalizer (DFE) branch input lines. The circuit 1300 includes a multiplexer circuit 1350 which generates three unfolded multiplexer circuit outputs for branches 7, 15, and 23 using a single multiplexer array network 1355.

Figure 14:
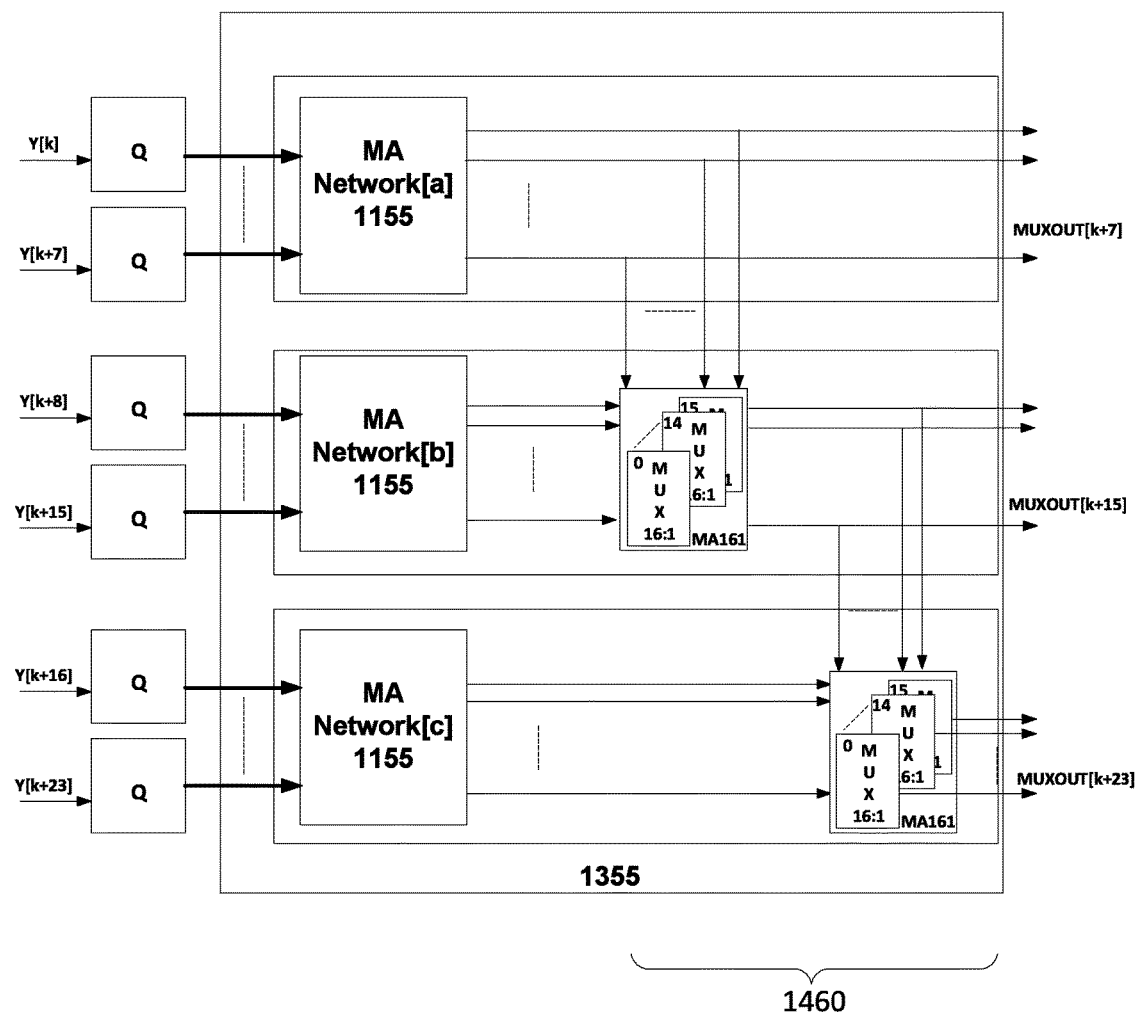
FIG. 14 is a schematic diagram showing aspects of the unfolding multiplexer array network of FIG. 13.

FIG. 14 shows a circuit 1400 including aspects of the example decision feedback circuit 1300 which generate the multiplexer output for branches Y[k+7], Y[k+15] and Y[k+23]. The multiplexer array network 1355 includes inner multiplexer array networks 1155, and an inter-subset multiplexer array network 1460.

In this example embodiment, the multiplexer circuit outputs MUXOUT[i] do not rely on the inputs from branches Y[k+24] to Y[k+31]. In some instances, this simplifies and reduces the size of the multiplexer circuit without sacrificing much signal quality.

Figure 15:
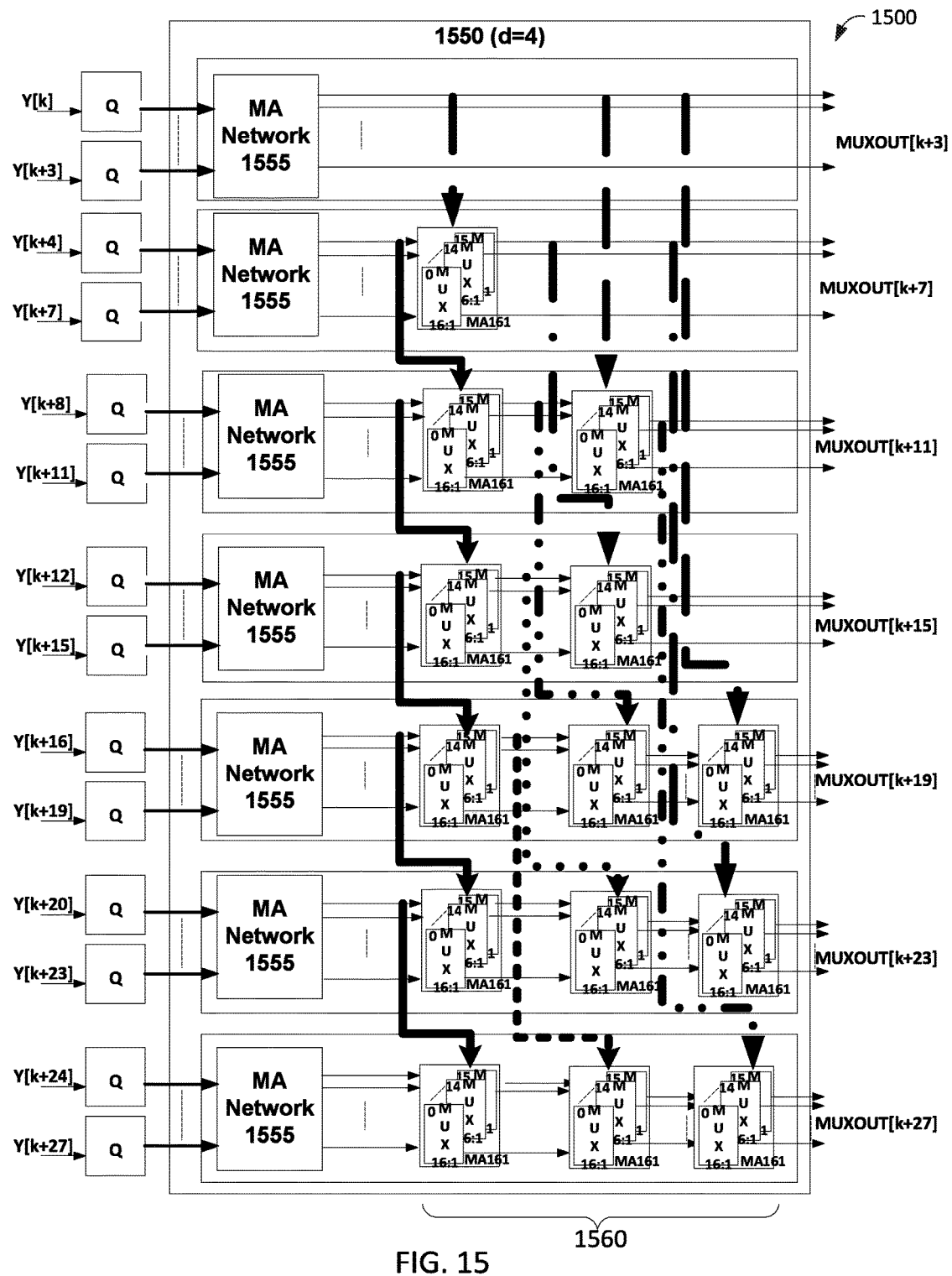
FIG. 15 is a schematic diagram showing aspects of another example architecture for generating unfolded outputs having a smaller distance between unfolded outputs.

FIG. 15 shows a circuit 1500 including aspects of an example decision feedback circuit 1550 where an unfolded output is generated for every $4^{th}$ branch rather than every $8^{th}$ branch in the previous example in FIG. 10. Stated differently, the number of branches d (distance) between unfolded branches is 4. This circuit 1500 also has L=32 branches, N=2 taps, and a PAM4 S=2 design, and has M=5 MUX stages between the inputs and the outputs of the multiplexer circuit.

Figure 16:
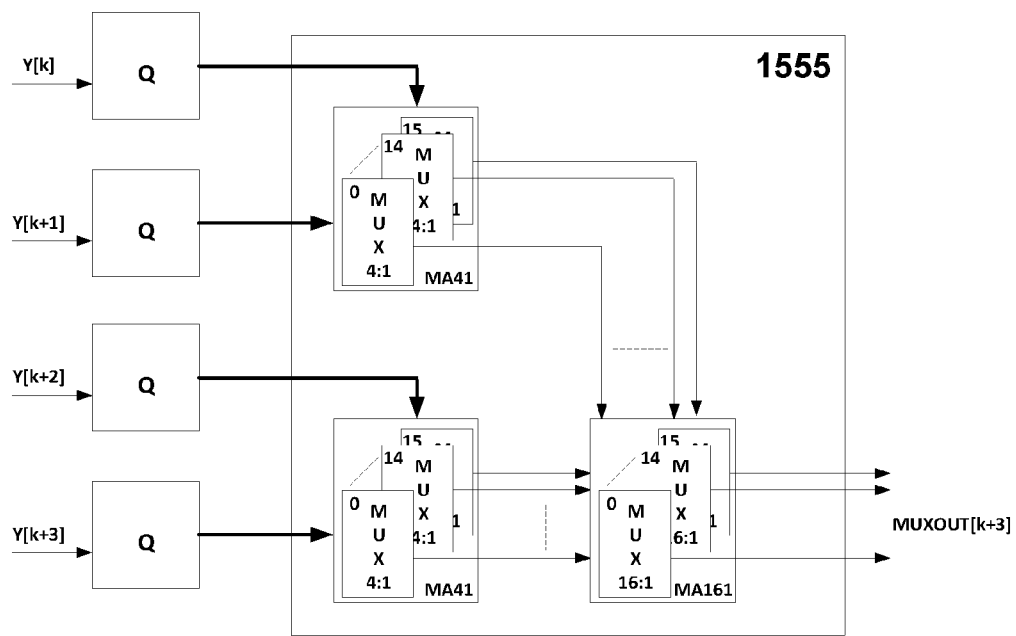
FIG. 16 is a schematic diagram aspects of an unfolding multiplexer array network for the architecture of FIG. 15.

In some embodiments, the inner multiplexer array networks 1555 for smaller values of d are simpler as illustrated in the example circuit 1600 in FIG. 16 which shows the multiplexer array network 1555 for d=4. This example multiplexer array network 1555 can be used for the circuit 1500 in FIG. 15.

If both even and odd unfolded outputs are needed, a two multiplexer array networks 1550 circuits can be used to generate 7 even and 7 odd unfolded output signals.

In some embodiments, the inter-subset multiplexer array network 1660 for a circuit having a smaller value of d may be larger.

In other embodiments, the circuit can be implemented to generate unfolded outputs for any distance d where d is an integer (e.g. d=2, d=4, d=6, etc.).

In some implementations, for a system consists of L lines of N-tap DFE filters, the DFE circuit designs based on this H-PML architecture can generate a maximum of U unfolded outputs using only a single multiplexer array network. This MA Network can be designed with H levels of unfolded stages where H=L−d−1, and M=$\log_2$ L MUX stages. In some embodiments, the number of unfolded outputs U supported by the H-PML based circuit is calculated as follows:

$$U = \frac{L}{d} - 1$$

where d is the number of slices (distance) between 2 unfolded outputs.

In some examples, the value of d affects the number of unfolded and unrolled branches in the circuit. This can, in some instances, be selected based on a desired size, speed and/or throughput (e.g. number of parallel branches L) for the circuit.

In some embodiments, to generate unfolded outputs where the distance d between unfolded branches is a mix of even (d=2n) and odd (d=2n+1) values, where n=1, . . . , L/4, two multiplexer array networks can be used. For example, one multiplexer array network can be used to generate unfolded signals for the even outputs, and one multiplexer array network can be used to generate signals for the odd outputs.

In some examples, one or more circuit architectures described herein may reduce the number of multiplexers in the critical path and/or the number of multiplexers in the circuit.

In some embodiments, the hybrid PML architecture (H-PML) illustrated by the examples herein can be used for N-tap, L lines DFE circuit implementations, and in some instances may achieve fast throughput performance with lower logic resources usage.

For example, compared to the circuit architecture 902 illustrated by FIG. 9C which utilizes 14 multiplexer array circuits, each having H=31 levels of unfolded stages to generate an unfolded output, the circuit architecture in FIG. 15 uses significantly fewer hardware resources.

In some examples, the circuit architectures illustrated by FIG. 15 can reduce the number of multiplexers in the critical path and/or the number of multiplexers in the circuit. For example, the use of multiplexer array outputs from one set of slices as inputs for one or more multiplexer arrays in other sets of slices may reduce the complexity of the circuit.

Table 1 below shows a comparison of the number of multiplexers required with for a circuit having N=2, L=32, number of unfolded output U=3, and distance d=8 when using an example Hybrid DFE architecture as illustrated by FIG. 9C versus an example hybrid DFE architecture as illustrated by FIG. 13.

TABLE 1

|  | HYBRID (FIG. 9C ARCHITECTURE) | HYBRID (FIG. 13 ARCHITECTURE) |
|---|---|---|
| # OF MA BLOCKS REQUIRED | 3 | 1 |
| # OF MUX ARRAY 4:1 (MA41) | 48 | 12 |
| # OF MUX ARRAY 16:1 (MA161) | 45 | 11 |

Table 2 below shows a comparison of the number of multiplexers required with for a circuit having N=2, L=32, number of unfolded output U=7, and distance d=4 when using an example Hybrid DFE architecture as illustrated by FIG. 9C versus an example hybrid DFE architecture as illustrated by FIG. 15.

TABLE 2

|  | HYBRID (FIG. 9C ARCHITECTURE) | HYBRID (FIG. 15 ARCHITECTURE) |
|---|---|---|
| # OF MA BLOCKS REQUIRED | 7 | 1 |
| # OF MUX ARRAY 4:1 (MA41) | 112 | 14 |
| # OF MUX ARRAY 16:1 (MA161) | 105 | 21 |

As described herein or otherwise, a hybrid architecture (H-PML) can be designed for L lines, N-tap, U unfolded output. The unfolding techniques and the architectures described herein can include a MUX network with H levels of unfolded stages and M MUX stages where H=L−d−1 and M=$\log_2$ L, respectively. In some embodiments, a single MA network can be used to generate U unfolded signals where U is even or odd and U L/2. Since the level of unfolded stages is smaller than L−1 and one single MA network can be used to generate multiple unfolded signals, in some embodiments, significant logic resources can been saved. In some instances, the smaller hardware requirements can result in lower power consumption.

In some embodiments, the number of unfolded stages H in the MUX network is of the order H=L−d−1<L−1. In some instances, this may shorten the critical path and/or may increase the speed of the circuit.

In some embodiments, the number of unfolded levels can been reduced from H=L−1 to H=L−d−1. In some instances, this may result in hardware savings.

In some embodiments, a single MA network of M=$\log_2$ L MUX stages can be used to generate U unfolded signals where U is even or odd and U L/2. Instead of using U MA networks to generate U unfolded output, only one single MA network of H unfolded stages and M=$\log_2$ L MUX stages can be used for such purposes. In some instances, this may result in hardware savings.

In some embodiments, multiplexer circuits described herein may include individual multiplexer components (as illustrated for example by the individual MUX units in the figures) and/or a combination of gates or logic circuitry suitable for performing one or more selections, or some combination thereof.

While the multiplexer circuits in some of the figures have been illustrated or described as including individual 16-to-1 or 4-to-1 MUX units, in some embodiments and where applicable, the multiplexer circuits may be created similarly through the use of smaller or larger MUXs (e.g. 2-to-1, 8-to-1, 32-to-1, etc.) or corresponding logic gates/circuitry.

In some embodiments, the circuits described herein may enable pipeline registers to be inserted into the circuit to split long delay paths through the multiplexer array networks into paths with smaller delays. In some embodiments, this may increase the speed of the circuit, and/or may increase the ability to design a highly parallel circuit with a large number of branches L. In some embodiments, this may increase the throughput of the circuit.

In some embodiments, the circuits described herein may require smaller logic resource usage, and in some examples, may enable high speed performance for N-tap DFE circuits. The hybrid architectures may, in some instances, allow for a greater number of taps and/or parallel feedback filter branches in a circuit design.

In some embodiments, the unrolled-unfolded circuits described herein may provide a circuit which is faster than a fully unrolled circuit, and smaller than a fully unfolded architecture.

In some examples, the reduction in the number of MUXs or the overall size of the MUX circuit may result in circuits with smaller cell areas.

In some examples, shortening PML delay may reduce the overall input to output delay path, and may result in a higher circuit throughput.

In some examples, shortened delays may allow for the use of a greater number of parallel lines which may result in higher circuit throughput.

In the examples above, the figures show circuits having 2-tap architectures. However, in other embodiments, the decision feedback circuits described herein may utilize a single-tap (1-tap) architecture, or other numbers of taps (3-tap, 4-tap, etc.). Despite the improved signal fidelity/accuracy of higher-tap architectures, single-tap architectures are commonly used because they have simpler designs, may perform faster and/or may require less hardware. In some embodiments, the hybrid unrolled-unfolded circuits described herein may be used for single-tap (1-tap) architectures. However, in other embodiments, the hybrid circuits described herein may allow for 2- or higher-tap architectures to be feasible from a speed, size, practical and/or cost standpoint. In some instances, a 2- or higher-tap hybrid architecture may reduce or eliminate error correction requirements for a system.

While the examples above show decision feedback circuits based on two quantization levels (e.g. +1. −1), aspects of the present disclosure may also apply to circuits having 2 or more quantization levels. For example, the circuit may have $2^A$ (e.g. 2, 4, 8, or 16) levels of quantization, where A is a positive integer.

While the example circuits in the figures above show non-return to zero (NRZ) architectures, aspects of the present disclosure may also apply to PAM-4 (pulse amplitude modulation) architectures (e.g. architectures with 2-bit inputs signals rather than the 1-bit signals for NRZ).

In some embodiments, example circuits described herein may be part of larger electronic devices. For example, a decision feedback circuit 1000, 1300, 1500 may be part of a larger circuit, such as a serializer/deserializer device. In some examples, a decision feedback circuit 1000, 1300, 1500 may be part of an interface for a communication channel. For example, a decision feedback circuit 1000, 1300, 1500 may be part of an interface between two chips, devices, etc.

In some embodiments, circuits based on the examples described herein may be part of an equalizer device, a receiver device, or an interface portion of a larger device having another purpose.

Figure 17:
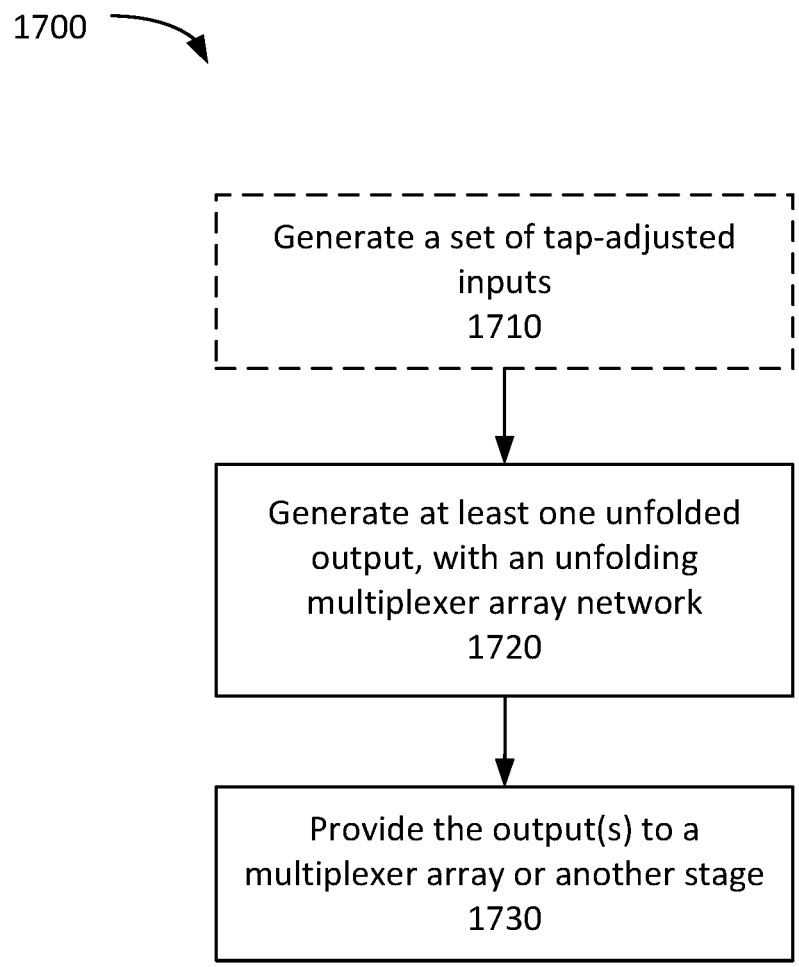
FIG. 17 is a flowchart showing aspects of an example method for decision feedback equalization.

FIG. 17 shows a flowchart showing aspects of an example method for decision feedback equalization for a decision feedback circuit having a plurality of DFE branches. At 1710, a circuit or device generates a set of tap-adjusted inputs for each decision feedback equalizer (DFE) branch in the decision feedback circuit. In some processes or circuits, this stage may not be necessary if the tap-adjusted inputs are already available or if tap-adjusted inputs are not required for the particular DFE implementation.

At 1720, an unfolding multiplexer array network generates at least one unfolded output for at least one branch of the decision feedback circuit. As described herein or otherwise, in some embodiments, the unfolding multiplexer array network includes a plurality of multiplexer arrays wherein outputs from a first multiplexer array in the plurality of multiplexer arrays are connected to selection lines of a second multiplexer array in the plurality of multiplexer arrays.

At 1730, the unfolding multiplexer array network provides its outputs to another multiplexer array or to a next stage in the DFE circuit or device as described herein or otherwise. In some instances, the outputs of a multiplexer array network are intermediate values provided to a subsequent multiplexer array or multiplexer array network in the multiplexer circuit stage of the DFE architecture. In some instances, the outputs of a multiplexer array network are provided as input values to an output block for use in the generation of an equalizer signal for one or more of the branches of the decision feedback circuit.

In some embodiments, generating 1720 one or more unfolded outputs can include propagating inputs to the unfolding multiplexer array network through a tree arrangement of multiplexer arrays in the network.

In some embodiments, generating 1720 the one or more unfolded outputs can include propagating inputs through multiple unfolding multiplexer array networks. One or more of the multiple unfolding multiplexer array networks are, in some embodiments, configured to generate one or more intermediate outputs. The one or more unfolded outputs can be generated based on the intermediate outputs using an inter-subset multiplexer array network. In some embodiments, one or more intermediate outputs of one unfolding multiplexer array network are provided to the inputs lines of a multiplexer array in the inter-subset network, and one or more intermediate outputs of a second unfolding multiplexer array network are provided to the selection lines of the multiplexer array in the inter-subset network.

In some embodiments, the intermediate outputs of the second unfolding multiplexer array network are provided to the selection lines of the multiplexer array in the inter-subset network after they propagate through another multiplexer array.

In some embodiments, at 1730, the unfolding multiplexer array network provides its outputs to an output block. The output block can, in some embodiments, include any circuit, device and/or other element configured to generate equalized output(s) for one or more branches in the DFE circuit. In some embodiments, the output block generates the equalized output(s) based on a selection from the one or more unfolded outputs and at least previous output value for the branch.

In circuit architectures having one or more unrolled branches, the method 1700 can include generating one or more unrolled outputs for the one or more unrolled branches using unrolling circuit(s), device(s), and/or other elements as illustrated for example in FIGS. 4, 8, 9A, 9C, or otherwise.

Various example embodiments are described herein. Although each example embodiment describes a single combination of elements, all possible combinations of the disclosed elements are contemplated by the present disclosure. For example, if one embodiment comprises elements A, B, and C, and a second embodiment comprises elements B and D, then the present disclosure contemplates all other remaining combinations of A, B, C, or D, even if not explicitly disclosed.

Although the present invention and its potential advantages have been described in detail, it should be understood that various changes, substitutions and alterations can be made herein without departing from the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A decision feedback circuit comprising:
    input lines for a plurality of N-tap decision feedback equalizer (DFE) branches, where N is a positive integer; and
    an unfolding multiplexer array network configured to generate at least one unfolded output based on the input lines for the plurality of DFE branches, the unfolding multiplexer array network including:
        a plurality of multiplexer arrays, each multiplexer array configured to generate at least one intermediate output from the input lines for a respective subset of the plurality of DFE branches; and an inter-subset multiplexer array configured to generate multiplexer array outputs based on the intermediate outputs of the plurality of multiplexer arrays;
wherein outputs from a first multiplexer array in the plurality of multiplexer arrays are connected to selection lines of the inter-subset multiplexer array in the plurality of multiplexer arrays.

2. The decision feedback circuit of claim 1 wherein the plurality of multiplexer arrays and the inter-subset multiplexer array in the unfolding multiplexer array network are arranged in a tree arrangement to generate the at least one unfolded output from the input lines for the plurality of DFE branches.

3. The decision feedback circuit of claim 1 comprising:
a plurality of unfolding multiplexer array networks, each unfolding multiplexer array network configured to generate at least one intermediate output from the inputs lines for a respective subset of the plurality of DFE branches; and
an inter-subset multiplexer array network configured to generate multiplexer array outputs based on the intermediate outputs of the plurality of unfolding multiplexer array networks.

4. The decision feedback circuit of claim 3, wherein the inter-subset multiplexer array network comprises a third multiplexer array having:
input line inputs based on at least in part on intermediate outputs of a first unfolding multiplexer array network of the plurality of unfolding multiplexer array networks; and
selection line inputs based at least in part on intermediate outputs of a second unfolding multiplexer array network of the plurality of unfolding multiplexer array networks.

5. The decision feedback circuit of claim 4 wherein the selection line inputs of the third multiplexer array are connected to outputs of a fourth multiplexer array, the fourth multiplexer array having input lines connected to the outputs of the second unfolding multiplexer array network.

6. The decision feedback circuit of claim 1 comprising: at least one output block configured to generate at least one branch output based on a selection from the at least one unfolded output of the unfolding multiplexer array network and at least one previous output branch value.

7. The decision feedback circuit of claim 1 comprising:
a pre-computation circuit for each of the plurality of DFE branches, each pre-computation circuit configured to generate a set of tap-adjusted inputs, each tap-adjusted input corresponding to a possible value for at least one previous output of the respective branch input line, wherein the sets of tap-adjusted inputs for the plurality of DFE branches provide inputs to the unfolding multiplexer array network.

8. The decision feedback circuit of claim 1, wherein the DFE branch input lines are 2-Tap DFE branch input lines.

9. The decision feedback circuit of claim 1, wherein a critical path between an input and an output of the unfolding multiplexer array network propagates through $\log_2 L$ MUX stages, where L is an integer corresponding to the number of DFE branches.

10. The decision feedback circuit of claim 1, wherein the decision feedback circuit includes at least one unrolled branch configured to generate at least one unrolled branch output based at least in part on the branch inputs of the at least one unrolled branch.

11. A method for decision feedback equalization, the method comprising:

for at least a first decision feedback equalizer (DFE) branch of a plurality of DFE branches in a decision feedback circuit:
generating at least one unfolded output, with an unfolding multiplexer array network, based on inputs for the plurality of DFE branches, the unfolding multiplexer array network including:
a plurality of multiplexer arrays, each multiplexer array configured to generate at least one intermediate output from the input lines for a respective subset of the plurality of DFE branches; and
an inter-subset multiplexer array configured to generate multiplexer array outputs based on the intermediate outputs of the plurality of multiplexer arrays; and
outputting the at least one unfolded output to an output block for use in the generation of an equalized signal for at least the first decision feedback equalizer branch.

12. The method of claim 11 wherein generating the at least one unfolded output from the inputs for the plurality of DFE branches comprises propagating inputs to the unfolding multiplexer array network through a tree arrangement of multiplexer arrays in the unfolding multiplexer array network.

13. The method claim 11 wherein generating the at least one unfolded output based on the inputs for the plurality of DFE branches comprises:
propagating inputs through a plurality of unfolding multiplexer array networks, each unfolding multiplexer array network configured to generate at least one intermediate output from inputs from a respective subset of the branch input lines; and
generating the at least one unfolded output, with an inter-subset multiplexer array network, based on the intermediate outputs of the plurality of unfolding multiplexer array networks.

14. The method of claim 13 wherein generating the at least one unfolded output with the inter-subset multiplexer array network comprises:
providing, to input lines of a third multiplexer array of the inter-subset multiplexer array network, inputs based on at least in part on intermediate outputs of a first unfolding multiplexer array network of the plurality of unfolding multiplexer array networks; and
providing, to selection lines of the third multiplexer array of the inter-subset multiplexer array network, inputs based at least in part on intermediate outputs of a second unfolding multiplexer array network of the plurality of unfolding multiplexer array networks.

15. The method of claim 14 wherein generating the at least one unfolded output with the inter-subset multiplexer array network comprises:
providing, to the selection lines of the third multiplexer array of the inter-subset multiplexer array network, inputs from outputs of a fourth multiplexer array, the fourth multiplexer array having input lines connected to the outputs of the second unfolding multiplexer array network.

16. The method of claim 11 comprising: generating at least one equalized branch output based on a selection from the at least one unfolded output of the unfolding multiplexer array network and at least one previous output branch value.

17. The method of claim 11 comprising:
generating, with a pre-computation circuit for each branch input in the subset of DFE branches, a set of tap-adjusted inputs, each tap-adjusted input corresponding to a possible value of a previous output for the corresponding branch input, and providing the sets of tap-adjusted inputs as inputs to the unfolding multiplexer array network.

18. The method of claim 11, wherein the plurality of DFE branches are 2-Tap DFE branches.

19. The method of claim 11, wherein a critical path between an input and an output of the unfolding multiplexer array network propagates through $\log_2 L$ MUX stages, where L is an integer corresponding to the number of DFE branches.

20. The method of claim 11, comprising: generating at least one unrolled output for at least one unrolled branch in the plurality of DFE branches.

21. An electronic device comprising:
- inputs lines for a plurality of N-tap decision feedback equalizer (DFE) branches, where N is a positive integer; and
- an unfolding multiplexer array network configured to generate at least one unfolded output based on the inputs lines for the DFE branches input lines, the unfolding multiplexer array network including:
  - a plurality of multiplexer arrays, each multiplexer array configured to generate at least one intermediate output from the input lines for a respective subset of the plurality of DFE branches; and
  - an inter-subset multiplexer array configured to generate multiplexer array outputs based on the intermediate outputs of the plurality of multiplexer arrays.

* * * * *